US012766936B2

(12) United States Patent
Yang et al.

(10) Patent No.: US 12,766,936 B2
(45) Date of Patent: Oct. 20, 2026

(54) ELECTRIC DRIVE ASSEMBLY, FOUR-WHEEL DRIVE SYSTEM, AND VEHICLE

(71) Applicant: BYD COMPANY LIMITED, Shenzhen (CN)

(72) Inventors: Dongsheng Yang, Shenzhen (CN); Shenglin Yang, Shenzhen (CN); Yuan Gao, Shenzhen (CN); Xiaosong Zou, Shenzhen (CN); Jinpeng Li, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 408 days.

(21) Appl. No.: 18/383,586

(22) Filed: Oct. 25, 2023

(65) Prior Publication Data

US 2024/0051387 A1 Feb. 15, 2024

Related U.S. Application Data

(63) Continuation of application No. PCT/CN2022/096241, filed on May 31, 2022.

(30) Foreign Application Priority Data

Jun. 30, 2021 (CN) ......................... 202110744962.8

(51) Int. Cl.
*B60K 1/02* (2006.01)
*B60K 17/04* (2006.01)
(Continued)

(52) U.S. Cl.
CPC ................ *B60K 1/02* (2013.01); *B60K 17/04* (2013.01); *B60K 17/354* (2013.01); (Continued)

(58) Field of Classification Search
CPC ................................ B60K 1/02; B60K 17/356
See application file for complete search history.

(56) References Cited

U.S. PATENT DOCUMENTS

| | | | | |
|---|---|---|---|---|
| 10,974,583 B2 * | 4/2021 | Huang | ..................... | B60K 6/24 |
| 12,540,661 B2 * | 2/2026 | Waltz | .................... | F16H 37/082 |

(Continued)

FOREIGN PATENT DOCUMENTS

| | | |
|---|---|---|
| CN | 102112333 B | 6/2011 |
| CN | 102991333 A | 3/2013 |

(Continued)

OTHER PUBLICATIONS

International Search Report and Written Opinion for Application No. PCT/CN2022/096241, mailed on Sep. 6, 2022, 8 pages.

*Primary Examiner* — Kevin Hurley
(74) *Attorney, Agent, or Firm* — Sheppard Mullin Richter & Hampton LLP

(57) ABSTRACT

An electric drive assembly has a first wheel drive assembly and a second wheel drive assembly. The first wheel drive assembly includes a first motor, a first gear reduction mechanism, and a first disengaging mechanism. When the first disengaging mechanism is switched to an engagement position of the first disengaging mechanism, power of the first motor is transmitted to a first wheel through the first gear reduction mechanism. The second wheel drive assembly includes a second motor, a second gear reduction mechanism, and a second disengaging mechanism. When the second disengaging mechanism is switched to an engagement position of the second disengaging mechanism, power of the second motor is transmitted to a second wheel through the second gear reduction mechanism. When the first disengaging mechanism or the second disengaging mechanism (Continued)

is switched to a disengagement position, the power of the motors to the corresponding wheels is interrupted.

18 Claims, 11 Drawing Sheets

(51) Int. Cl.
*B60K 17/354* (2006.01)
*B60K 17/356* (2006.01)
*B60K 7/00* (2006.01)

(52) U.S. Cl.
CPC .... *B60K 17/356* (2013.01); *B60K 2007/0061* (2013.01); *F16H 2200/0021* (2013.01)

(56) References Cited

U.S. PATENT DOCUMENTS

| | | | |
|---|---|---|---|
| 2016/0207390 | A1 | 7/2016 | Yang et al. |
| 2021/0033182 | A1 | 2/2021 | Murakami et al. |

FOREIGN PATENT DOCUMENTS

| | | | | | |
|---|---|---|---|---|---|
| CN | 103998268 | A | | 8/2014 | |
| CN | 105459815 | A | | 4/2016 | |
| CN | 206141296 | U | | 5/2017 | |
| CN | 107009869 | A | | 8/2017 | |
| CN | 106945497 | B | * | 4/2019 | ............. B60K 17/04 |
| CN | 109649140 | A | | 4/2019 | |
| CN | 210652645 | U | | 6/2020 | |
| CN | 109866613 | B | | 11/2020 | |
| CN | 112277611 | A | | 1/2021 | |
| CN | 112277612 | A | | 1/2021 | |
| CN | 112406497 | A | | 2/2021 | |
| CN | 118849669 | A | * | 10/2024 | ............... B60K 1/02 |
| DE | 102019205618 | A1 | | 10/2020 | |
| GB | 2571130 | A | | 8/2019 | |
| JP | H-02-306828 | A | | 12/1990 | |
| JP | 2015-010669 | A | | 1/2015 | |
| JP | 2017178010 | A | | 10/2017 | |
| JP | 2018137887 | A | | 8/2018 | |
| JP | 2020143715 | A | | 9/2020 | |
| WO | 2020/120723 | A1 | | 6/2020 | |

* cited by examiner

ELECTRIC DRIVE ASSEMBLY, FOUR-WHEEL DRIVE SYSTEM, AND VEHICLE

CROSS-REFERENCE TO RELATED APPLICATIONS

This application is a Continuation Application of International Patent Application No. PCT/CN2022/096241, filed on May 31, 2022, which is based on and claims priority to and benefits of Chinese Patent Application No. 202110744962.8, filed on Jun. 30, 2021. The entire content of all of the above-referenced applications is incorporated herein by reference.

FIELD

The present disclosure relates to the field of vehicle drive technologies, and more particularly, to an electric drive assembly, a four-wheel drive system, and a vehicle.

BACKGROUND

In a four-wheel drive system, four motors separately and independently drive four wheels of a vehicle, and torque and speeds of the four wheels can be precisely controlled independently. In this way, a series of advantages are brought, for example, a smaller radius of turning circle, an assisting ESP (electronic stability program) function, an assisting steering function, and an assisting braking function are achieved. Wheel-side drive is a solution often adopted in the four-wheel drive system. In existing wheel-side drive solutions, left and right drive assemblies are often formed separately, or are simply mechanically connected to each other. As a result, an integration level is not high, a lot of space is occupied, and the costs are high.

In addition, because motors are always coupled with wheels through reduction gears in the existing wheel-side drive solutions, when a four-wheel drive vehicle selects to use a two-wheel drive mode for driving, drag resistance is generated when the motors and the reduction gears rotate along with the wheels, reducing economy and an endurance mileage of the entire vehicle.

SUMMARY

The present disclosure is to resolve at least one of the technical problems in the prior art. In view of this, in a first aspect, the present disclosure provides an electric drive assembly, which can reduce or interrupt drag resistance when motors and gear reduction mechanisms rotate along with the wheels, and improve economy and an endurance mileage of an entire vehicle.

In a second aspect, an embodiment of the present disclosure further provides a four-wheel drive system, including a front drive bridge and a rear drive bridge. The foregoing electric drive assembly is disposed on both the front drive bridge and the rear drive bridge.

In a third aspect, an embodiment of the present disclosure further provides a vehicle, including the foregoing electric drive assembly or four-wheel drive system.

According to the present disclosure, the electric drive assembly includes: a first wheel drive assembly configured to drive a first wheel and a second wheel drive assembly configured to drive a second wheel. One of the first wheel and the second wheel is a left side wheel, and the other one of the first wheel and the second wheel is a right side wheel. The first wheel drive assembly includes a first motor, a first gear reduction mechanism, and a first disengaging mechanism, the first gear reduction mechanism is connected between the first motor and the first wheel, and the first disengaging mechanism is configured to switch between an engagement position and a disengagement position of the first disengaging mechanism. When the first disengaging mechanism is switched to the engagement position of the first disengaging mechanism, power of the first motor is transmitted to the first wheel through the first gear reduction mechanism. When the first disengaging mechanism is switched to the disengagement position of the first disengaging mechanism, power transmission between the first motor and the first wheel is interrupted. The second wheel drive assembly includes a second motor, a second gear reduction mechanism, and a second disengaging mechanism, the second gear reduction mechanism is connected between the second motor and the second wheel, and the second disengaging mechanism is configured to switch between an engagement position and a disengagement position of the second disengaging mechanism. When the second disengaging mechanism is switched to the engagement position of the second disengaging mechanism, power of the second motor is transmitted to the second wheel through the second gear reduction mechanism. When the second disengaging mechanism is switched to the disengagement position of the second disengaging mechanism, power transmission between the second motor and the second wheel is interrupted.

When a vehicle using the electric drive assembly in the present disclosure selects to use a two-wheel drive mode, a first disengaging mechanism and a second disengaging mechanism that disconnect a front shaft or a rear shaft of the electric drive assembly can reduce or interrupt drag resistance when motors and gear reduction mechanisms rotate along with the wheels, to improve economy and an endurance mileage of the entire vehicle.

In an embodiment of the present disclosure, the engagement position of the first disengaging mechanism includes a first engagement position and a second engagement position of the first disengaging mechanism. When the first disengaging mechanism is switched to the first engagement position of the first disengaging mechanism, the power of the first motor is transmitted to the first wheel through a first gear transmission path of the first gear reduction mechanism. When the first disengaging mechanism is switched to the second engagement position of the first disengaging mechanism, the power of the first motor is transmitted to the first wheel through a second gear transmission path of the first gear reduction mechanism; and the second gear reduction mechanism has two drive gear positions, and the engagement position of the second disengaging mechanism includes a first engagement position and a second engagement position of the second disengaging mechanism. When the second disengaging mechanism is switched to the first engagement position of the second disengaging mechanism, the power of the second motor is transmitted to the second wheel through a first gear transmission path of the second gear reduction mechanism. When the second disengaging mechanism is switched to the second engagement position of the second disengaging mechanism, the power of the second motor is transmitted to the second wheel through a second gear transmission path of the second gear reduction mechanism.

In an embodiment of the present disclosure, a locking mechanism is disposed between the first wheel drive assembly and the second wheel drive assembly, and the locking mechanism is configured to switch between an engagement position and a disengagement position of the locking mechanism. When the locking mechanism is switched to the engagement position of the locking mechanism, the first motor is in power coupling with the second motor, and when the locking mechanism is switched to the disengagement position of the locking mechanism, the power coupling between the first motor and the second motor is interrupted.

In an embodiment of the present disclosure, the first motor and the second motor are disposed in parallel. One of the first motor and the second motor is parallel to and spaced from a wheel shaft of a corresponding wheel and partially overlaps a projection of the wheel shaft of the corresponding wheel in a left-right direction, or one of the first motor and the second motor is coaxial with a wheel shaft of a corresponding wheel.

In an embodiment of the present disclosure, a motor shaft of the first motor is configured to provide a first single-ended output, a motor shaft of the second motor is configured to provide a second single-ended output, and the locking mechanism is disposed between a wheel shaft of the first wheel and a wheel shaft of the second wheel. When the locking mechanism is switched to the engagement position of the locking mechanism, the wheel shaft of the first wheel is connected to the wheel shaft of the second wheel, so that the first motor is in power coupling with the second motor. When the locking mechanism is switched to the disengagement position of the locking mechanism, the wheel shaft of the first wheel is disconnected from the wheel shaft of the second wheel, so that the power coupling between the first motor and the second motor is interrupted.

In an embodiment of the present disclosure, a motor shaft of the first motor is configured to provide a double-ended output, a motor shaft of the second motor is configured to provide a single-ended output, and the locking mechanism is disposed at a second output end of the motor shaft of the first motor. A first output end of the motor shaft of the first motor is in transmission connection to the first wheel through the first gear reduction mechanism, and an output end of the motor shaft of the second motor is in transmission connection to the second wheel through the second gear reduction mechanism. When the locking mechanism is switched to the engagement position of the locking mechanism, the second output end of the motor shaft of the first motor is in transmission connection to the second gear reduction mechanism, so that the first motor is in power coupling with the second motor. When the locking mechanism is switched to the disengagement position of the locking mechanism, the second output end of the motor shaft of the first motor is disconnected from the second gear reduction mechanism, so that the power coupling between the first motor and the second motor is interrupted.

In an embodiment of the present disclosure, a motor shaft of the first motor is configured to provide a first double-ended output, a motor shaft of the second motor is configured to provide a second double-ended output, and the locking mechanism includes a first locking mechanism and a second locking mechanism. A first output end of the motor shaft of the first motor is in transmission connection to the first wheel through the first gear reduction mechanism, a second output end of the motor shaft of the first motor is connected to the second gear reduction mechanism through the first locking mechanism, a first output end of the motor shaft of the second motor is in transmission connection to the second wheel through the second gear reduction mechanism, and a second output end of the motor shaft of the second motor is connected to the first gear reduction mechanism through the second locking mechanism. When the first locking mechanism is switched to an engagement position of the first locking mechanism and the second locking mechanism is switched to an engagement position of the second locking mechanism, the second output end of the motor shaft of the first motor is in transmission connection to the second gear reduction mechanism and drives the second wheel, and the second output end of the motor shaft of the second motor is in transmission connection to the first gear reduction mechanism and drives the first wheel, so that the first motor is in power coupling with the second motor, to drive the first wheel and the second wheel. When the first locking mechanism is switched to the engagement position of the first locking mechanism and the second locking mechanism is switched to a disengagement position of the second locking mechanism, the second output end of the motor shaft of the first motor is in transmission connection to the second gear reduction mechanism and drives the second wheel, and the second output end of the motor shaft of the second motor is disconnected from the first gear reduction mechanism, so that the first motor is in power coupling with the second motor, to jointly drive the second wheel. When the first locking mechanism is switched to a disengagement position of the first locking mechanism and the second locking mechanism is switched to the engagement position of the second locking mechanism, the second output end of the motor shaft of the second motor is in transmission connection to the first gear reduction mechanism, and the second output end of the motor shaft of the first motor is disconnected from the second gear reduction mechanism, so that the first motor is in power coupling with the second motor, to drive the first wheel. When the first locking mechanism is switched to the disengagement position of the first locking mechanism and the second locking mechanism is switched to the disengagement position of the second locking mechanism, the second output end of the motor shaft of the first motor is disconnected from the second gear reduction mechanism, and the second output end of the motor shaft of the second motor is disconnected from the first gear reduction mechanism, so that the power coupling between the first motor and the second motor is interrupted.

In an embodiment of the present disclosure, the first motor and the second motor are coaxially disposed, and the first gear reduction mechanism and the second gear reduction mechanism are located between the first motor and the second motor.

In an embodiment of the present disclosure, a motor shaft of the first motor is configured to provide a first single-ended output, a motor shaft of the second motor is configured to provide a first single-ended output, the locking mechanism is disposed between a wheel shaft of the first wheel and a wheel shaft of the second wheel, and the locking mechanism is configured to switch between the engagement position of the locking mechanism and the disengagement position of the locking mechanism. When the locking mechanism is switched to the engagement position of the locking mechanism, the wheel shaft of the first wheel is connected to the wheel shaft of the second wheel, so that the first motor is in power coupling with the second motor. When the locking mechanism is switched to the disengagement position of the locking mechanism, the wheel shaft of the first wheel is disconnected from the wheel shaft of the second wheel, so that the power coupling between the first motor and the second motor is interrupted.

In an embodiment of the present disclosure, the wheel shaft of the first wheel and the wheel shaft of the second wheel are coaxial, the first motor, the second motor, and the wheel shaft of the first wheel are parallel to and spaced from each other, and the first motor, the second motor, and the wheel shaft of the first wheel are arranged in a triangle.

In an embodiment of the present disclosure, a motor shaft of the first motor is configured to provide a first single-ended output, a motor shaft of the second motor is configured to provide a second single-ended output, the locking mechanism is disposed between a wheel shaft of the first wheel and a wheel shaft of the second wheel, and the locking mechanism is configured to switch between the engagement position and the disengagement position of the locking mechanism. When the locking mechanism is switched to the engagement position of the locking mechanism, the wheel shaft of the first wheel is connected to the wheel shaft of the second wheel, so that the first motor is in power coupling with the second motor. When the locking mechanism is switched to the disengagement position of the locking mechanism, the wheel shaft of the first wheel is disconnected from the wheel shaft of the second wheel, so that the power coupling between the first motor and the second motor is interrupted.

In an embodiment of the present disclosure, a motor shaft of the first motor is configured to provide a double-ended output, a motor shaft of the second motor is configured to provide a single-ended output, and the locking mechanism is disposed at a second output end of the motor shaft of the first motor. A first output end of the motor shaft of the first motor is in transmission connection to the first wheel through the first gear reduction mechanism, and an output end of the motor shaft of the second motor is in transmission connection to the second wheel through the second gear reduction mechanism. When the locking mechanism is switched to the engagement position of the locking mechanism, the second output end of the motor shaft of the first motor is in transmission connection to the second gear reduction mechanism, so that the first motor is in power coupling with the second motor. When the locking mechanism is switched to the disengagement position of the locking mechanism, the second output end of the motor shaft of the first motor is disconnected from the second gear reduction mechanism, so that the power coupling between the first motor and the second motor is interrupted.

In an embodiment of the present disclosure, a motor shaft of the first motor is configured to provide a first double-ended output, a motor shaft of the second motor is configured to provide a second double-ended output, and the locking mechanism includes a first locking mechanism and a second locking mechanism. A first output end of the motor shaft of the first motor is in transmission connection to the first wheel through the first gear reduction mechanism, a second output end of the motor shaft of the first motor is connected to the second gear reduction mechanism through the first locking mechanism, a first output end of the motor shaft of the second motor is in transmission connection to the second wheel through the second gear reduction mechanism, and a second output end of the motor shaft of the second motor is connected to the first gear reduction mechanism through the second locking mechanism. When the first locking mechanism is switched to an engagement position of the first locking mechanism and the second locking mechanism is switched to an engagement position of the second locking mechanism, the second output end of the motor shaft of the first motor is in transmission connection to the second gear reduction mechanism and drives the second wheel, and the second output end of the motor shaft of the second motor is in transmission connection to the first gear reduction mechanism and drives the first wheel, so that the first motor is in power coupling with the second motor, to drive the first wheel and the second wheel. When the first locking mechanism is switched to the engagement position of the first locking mechanism and the second locking mechanism is switched to a disengagement position of the second locking mechanism, the second output end of the motor shaft of the first motor is in transmission connection to the second gear reduction mechanism and drives the second wheel, and the second output end of the motor shaft of the second motor is disconnected from the first gear reduction mechanism, so that the first motor is in power coupling with the second motor, to jointly drive the second wheel. When the first locking mechanism is switched to a disengagement position of the first locking mechanism and the second locking mechanism is switched to the engagement position of the second locking mechanism, the second output end of the motor shaft of the second motor is in transmission connection to the first gear reduction mechanism, and the second output end of the motor shaft of the first motor is disconnected from the second gear reduction mechanism, so that the first motor is in power coupling with the second motor, to drive the first wheel. When the first locking mechanism is switched to the disengagement position of the first locking mechanism and the second locking mechanism is switched to the disengagement position of the second locking mechanism, the second output end of the motor shaft of the first motor is disconnected from the second gear reduction mechanism, and the second output end of the motor shaft of the second motor is disconnected from the first gear reduction mechanism, so that the power coupling between the first motor and the second motor is interrupted.

In an embodiment of the present disclosure, the locking mechanism includes a synchronizer integrating with a one-way clutch.

In an embodiment of the present disclosure, a first planet gear mechanism is disposed between the first gear reduction mechanism and the wheel shaft of the first wheel, and a second planet gear mechanism is disposed between the second gear reduction mechanism and the wheel shaft of the second wheel. A gear ring of the first planet gear mechanism is connected to an output end of the first gear reduction mechanism, and a planet carrier of the first planet gear mechanism is connected to the wheel shaft of the first wheel; or a sun gear of the first planet gear mechanism is connected to an output end of the first gear reduction mechanism, and a planet carrier of the first planet gear mechanism is connected to the wheel shaft of the first wheel. A gear ring of the second planet gear mechanism is connected to an output end of the second gear reduction mechanism, and a planet carrier of the second planet gear mechanism is connected to the wheel shaft of the second wheel; or a sun gear of the second planet gear mechanism is connected to an output end of the second gear reduction mechanism, and a planet carrier of the second planet gear mechanism is connected to the wheel shaft of the second wheel.

The four-wheel drive system according to the present disclosure includes a front drive bridge and a rear drive bridge. The foregoing electric drive assembly according to any one of the foregoing embodiments is disposed on both the front drive bridge and the rear drive bridge. Because the electric drive assembly in the foregoing embodiment is disposed on the four-wheel drive system according to the present disclosure, the four-wheel drive system has a long battery life.

The electric drive assembly according to any one of the foregoing embodiments or the four-wheel drive system is disposed on the vehicle according to the present disclosure.

The electric drive assembly according to any one of the foregoing embodiments or the four-wheel drive system is disposed on the vehicle according to the present disclosure. Therefore, when the vehicle selects to use a two-wheel drive mode, a first disengaging mechanism and a second disengaging mechanism that disconnect a front shaft or a rear shaft of the electric drive assembly can reduce or interrupt drag resistance when motors and gear reduction mechanisms rotate along with the wheels, to improve economy and an endurance mileage of the entire vehicle.

Additional aspects and advantages of the present disclosure will be given in the following description, some of which will become apparent from the following description or may be learned from practices of the present disclosure.

Figure 1:
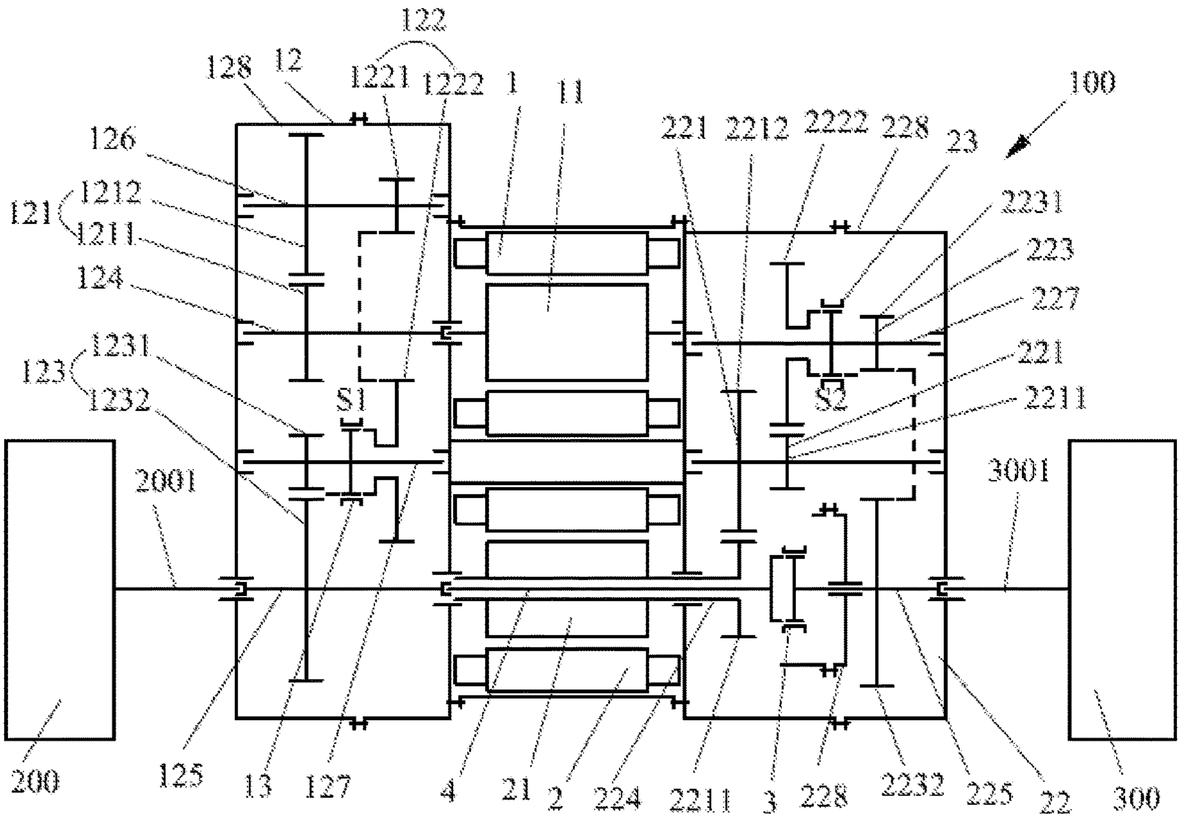
FIG. 1 is a schematic diagram of an electric drive assembly according to First Embodiment of the present disclosure.

Reference numerals in the description are as follows:

10000: Vehicle. 1000: Four-wheel drive system. 100: Electric drive assembly. 200: First wheel. 2001: Wheel shaft of the first wheel. 300: Second wheel. 3001: Wheel shaft of the second wheel. 400: Front drive bridge. 500: Rear drive bridge.

1: First wheel drive assembly. 11: First motor. 12: First gear reduction mechanism. 121: First reduction gear set. 1211: First driving gear. 1212: First driven gear. 122: Second reduction gear set. 1221: Second driving gear. 1222: Second driven gear. 1223: First transition gear. 123: Third reduction gear set. 1231: Third driving gear. 1232: Third driven gear. 124: First input shaft. 125: First output shaft. 126: First intermediate shaft. 127: Second intermediate shaft. **127*a*: First intermediate gear. 128: Housing of the first gear reduction mechanism. 129: Fourth reduction gear set. 1291: Fourth driving gear. 1292: Fourth driven gear. 13: First disengaging mechanism. 14: First planet gear mechanism. 141: Gear ring. 142: Planet carrier. 143**: Sun gear.

2: Second wheel drive assembly. 21: Second motor. 22: Second gear reduction mechanism. 221: Fourth reduction gear set. 2211: Fourth driving gear. 2212: Fourth driven gear. 222: Fifth reduction gear set. 2221: Fifth driving gear. 2222: Fifth driven gear. 223: Sixth reduction gear set. 2231: Sixth driving gear. 2232: Sixth driven gear. 2233: Second transition gear. 224: Second input shaft. 225: Second output shaft. 226: Third intermediate shaft. 227: Fourth intermediate shaft. **227*a*: Second intermediate gear. 228: Housing of the second gear reduction mechanism. 2281: Intermediate support structure. 229: Seventh reduction gear set. 2291: Seventh driving gear. 2292: Seventh driven gear. 220: Eighth reduction gear set. 2201: Eighth driving gear. 2202: Eighth driven gear. 23: Second disengaging mechanism. 24: Locking shaft. 25: Locking gear. 26: Second planet gear mechanism. 261: Gear ring. 262: Planet carrier. 263**: Sun gear.

3: Locking mechanism. 31: First locking mechanism. 32: Second locking mechanism.

4: Connecting shaft.

DETAILED DESCRIPTION

Embodiments of the present disclosure are described in detail below, and examples of the embodiments are shown in accompanying drawings, where the same or similar elements or the elements having same or similar functions are denoted by the same or similar reference numerals throughout the description. The embodiments that are described with reference to the accompany drawings are some of the embodiments of the present disclosure, and are only used to interpret the present disclosure, instead limiting the present disclosure.

An electric drive assembly 100 according to the embodiments of the present disclosure is described below with reference to FIG. 1 to FIG. 22.

Hereinafter, an X direction represents a front-rear direction of a vehicle, and a Y direction represents a left-right direction of the vehicle.

First Embodiment

Figure 2:
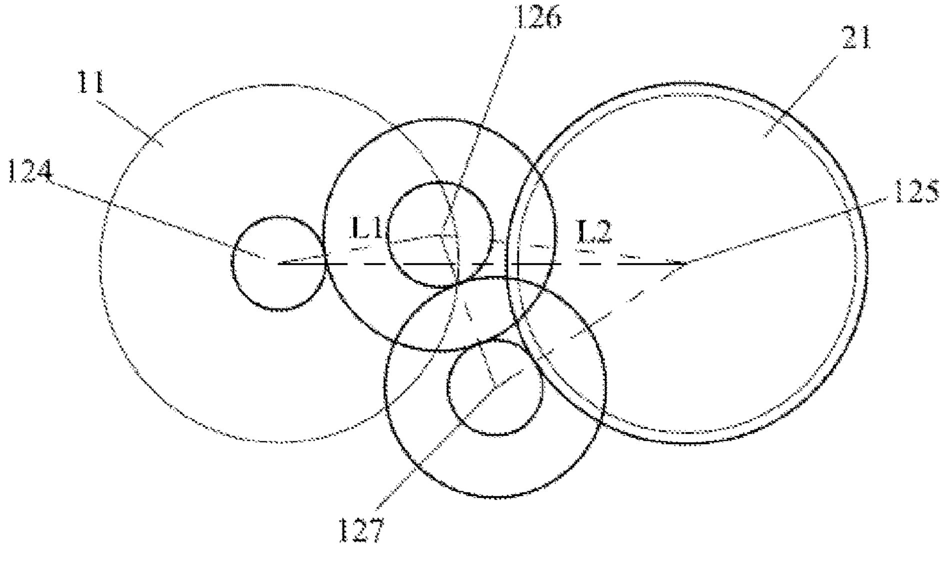
FIG. 2 is a left side view of an electric drive assembly according to First Embodiment of the present disclosure.
Figure 3:
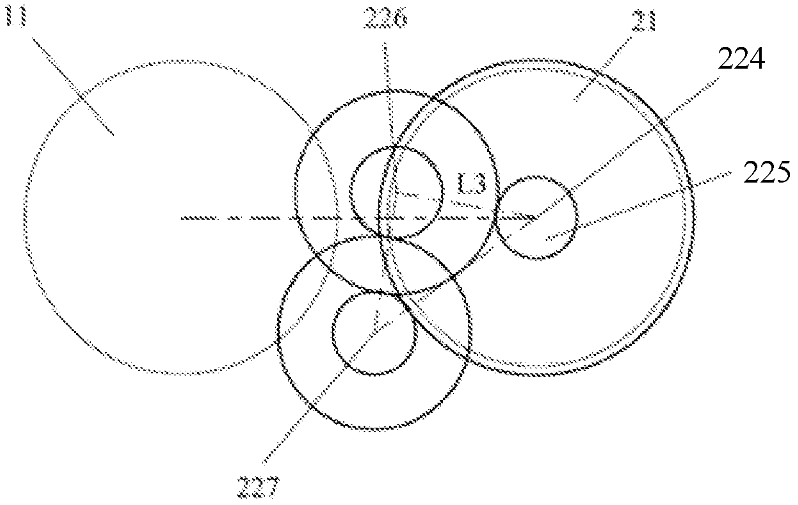
FIG. 3 is a right side view of an electric drive assembly according to First Embodiment of the present disclosure.

Refer to FIG. 1 to FIG. 3. The electric drive assembly 100 according to First Embodiment of the present disclosure includes a first wheel drive assembly 1 configured to drive a first wheel 200 and a second wheel drive assembly 2 configured to drive a second wheel 300. The first wheel 200 is a left side wheel, and the second wheel 300 is a right side wheel.

The first wheel drive assembly 1 includes a first motor 11, a first gear reduction mechanism 12, and a first disengaging mechanism 13, the first gear reduction mechanism 12 is connected between the first motor 11 and the first wheel 200, and the first disengaging mechanism 13 is switchable between an engagement position and a disengagement position of the first disengaging mechanism. When the first disengaging mechanism 13 is switched to the engagement position, power of the first motor 11 is transmitted to the first wheel 200 through the first gear reduction mechanism 12. When the first disengaging mechanism 13 is switched to the disengagement position, power transmission between the first motor 11 and the first wheel 200 is interrupted.

The second wheel drive assembly 2 includes a second motor 21, a second gear reduction mechanism 22, and a second disengaging mechanism 23, the second gear reduction mechanism 22 is connected between the second motor 21 and the second wheel 300, and the second disengaging mechanism 13 is switchable between an engagement position and a disengagement position the second disengaging mechanism. When the second disengaging mechanism 23 is switched to the engagement position, power of the second motor 21 is transmitted to the second wheel 300 through the second gear reduction mechanism 22. When the second disengaging mechanism 23 is switched to the disengagement position, power transmission between the second motor 21 and the second wheel 300 is interrupted.

In this embodiment, the electric drive assembly is arranged/configured in an H shape. Each of the first motor 11 and the second motor 21 uses an elongated motor with a small core diameter and a long length. The first motor 11 and the second motor 21 are arranged/disposed in parallel, and both a motor shaft of the first motor 11 and a motor shaft of the second motor 21 extend in the left-right direction of the vehicle. The second motor 21 and a wheel shaft 3001 of the second wheel 300 are coaxially arranged/disposed, so that a Y-directional length of the electric drive assembly 100 is greatly reduced, and X-directional space of the vehicle is fully utilized.

The first motor 11 and the second motor 21 are arranged/disposed side by side in the front-rear direction, the first gear reduction mechanism 12 and the second gear reduction mechanism 22 are located on left and right sides of the two motors, and an electric control box may be manufactured in a flat type structure by using an all-in-one solution and is mounted above the two motors. In this way, an entire structure is compact, space utilization is high, and high integration of motors, electric control, and reducers is realized.

The first gear reduction mechanism 12 is a single gear three-level gear reducer. The first gear reduction mechanism 12 includes a first reduction gear set 121, a second reduction gear set 122, a third reduction gear set 123, a first input shaft 124, a first output shaft 125, a first intermediate shaft 126, and a second intermediate shaft 127. The first reduction gear set 121 includes a first driving gear 1211 and a first driven gear 1212 that are meshed with each other. The second reduction gear set 122 includes a second driving gear 1221 and a second driven gear 1222 that are meshed with each other. The third reduction gear set 123 includes a third driving gear 1231 and a third driven gear 1232 that are meshed with each other. The first input shaft 124 is connected to the first motor 11, the first output shaft 125 is connected to a wheel shaft 2001 of the first wheel 200, the first driving gear 1211 is arranged/disposed on the first input shaft 124, the first driven gear 1212 and the second driving gear 1221 are arranged/disposed on the first intermediate shaft 126, the second driven gear 1222 and the third driving gear 1231 are arranged/disposed on the second intermediate shaft 127, and the third driven gear 1232 is arranged/disposed on the first output shaft 125.

The second driven gear 1222 is an idler gear that is sleeved on the shaft (the second intermediate shaft 127) on which the second driven gear 1222 is located, and remaining gear gears are fixed gears that are fixed on shafts on which the remaining gear gears are located. The first disengaging mechanism 13 is a first synchronizer S1, and the first synchronizer S1 is arranged/disposed on one axial side of the second driven gear 1222. The first synchronizer S1 can be selectively engaged with and disengaged from the second driven gear 1222, to realize combination or disconnection between the second driven gear 1222 and the shaft on which the second driven gear 1222 is located. When the first synchronizer S1 is engaged with the second driven gear 1222, the power of the first motor 11 can sequentially pass through the first input shaft 124, the first reduction gear set 121, the second reduction gear set 122, the third reduction gear set 123, and the first output shaft 125 to be transmitted to the first wheel 200. When the first synchronizer S1 is disengaged from the second driven gear 1222, a power transmission path from the first motor 11 to the first wheel 200 is disconnected at the second driven gear 1222.

The second gear reduction mechanism 22 is a single gear three-level gear reducer. The second gear reduction mechanism 22 includes a fourth reduction gear set 221, a fifth reduction gear set 222, a sixth reduction gear set 223, a second input shaft 224, a second output shaft 225, a third intermediate shaft 226, and a fourth intermediate shaft 227. The fourth reduction gear set 221 includes a fourth driving gear 2211 and a fourth driven gear 2212 that are meshed with each other. The fifth reduction gear set 222 includes a fifth driving gear 2221 and a fifth driven gear 2222 that are meshed with each other. The sixth reduction gear set 223 includes a sixth driving gear 2231 and a sixth driven gear 2232 that are meshed with each other. The second input shaft 224 is connected to the second motor 21, the second output shaft 225 is connected to the wheel shaft 3001 of the second wheel 300, the fourth driving gear 2211 is arranged/disposed on the second input shaft 224, the fourth driven gear 2212 and the fifth driving gear 2221 are arranged/disposed on the third intermediate shaft 226, the fifth driven gear 2222 and the sixth driving gear 2231 are arranged/disposed on the fourth intermediate shaft 227, and the sixth driven gear 2232 is arranged/disposed on the second output shaft 225.

The fifth driven gear 2222 is an idler gear that is sleeved on the shaft (the fourth intermediate shaft 227) on which the fifth driven gear 2222 is located, and remaining gear gears are fixed gears that are fixed on shafts on which the remaining gear gears are located. The second disengaging mechanism 23 is a second synchronizer S2, and the second synchronizer S2 is arranged/disposed on one axial side of the fifth driven gear 2222. The second synchronizer S2 can be selectively engaged with and disengaged from the fifth driven gear 2222, to realize combination or disconnection between the fifth driven gear 2222 and the shaft on which the fifth driven gear 2222 is located. When the second synchronizer S2 is engaged with the fifth driven gear 2222, the power of the second motor 21 can sequentially pass through the second input shaft 224, the fourth reduction gear set 221, the fifth reduction gear set 222, and the sixth reduction gear set 223, and the second output shaft 225 to be transmitted to the second wheel 300. When the second synchronizer is disengaged from the fifth driven gear 2222, a power transmission path from the second motor 21 to the second wheel 300 is disconnected at the fifth driven gear 2222.

When the electric drive assembly enters a follow-up mode, the first synchronizer S1 can disconnect power of the second reduction gear set 122 and the third reduction gear set 123, and the first motor 11, the first reduction gear set 121, and the second reduction gear set 122 keep still. In addition, the second synchronizer S2 can disconnect power of the fifth reduction gear set 222 and the sixth reduction gear set 223, and the second motor 21, the fourth reduction gear set 221, and the fifth reduction gear set 222 keep still.

In First Embodiment, the first input shaft 124, the first output shaft 125, the first intermediate shaft 126, and the second intermediate shaft 127 are spaced parallel to each other, and the first input shaft 124 and the motor shaft of the first motor 11 are coaxially connected to each other. Two ends of the first input shaft 124, the first output shaft 125, the first intermediate shaft 126, and the second intermediate shaft 127 are all rotatably supported on a housing 128 of the first gear reduction mechanism 12 through bearings. The second input shaft 224, the third intermediate shaft 226, and the fourth intermediate shaft 227 are spaced parallel to each other, the second input shaft 224 and the motor shaft of the second motor 21 are coaxially connected to each other or are integrally formed, and the second input shaft 224 and the second output shaft 225 are coaxial and are spaced from each other in a lateral direction. Two ends of the third intermediate shaft 226 and the fourth intermediate shaft 227 are all rotatably supported on a housing 228 of the second gear reduction mechanism 22 through bearings. An end of the second output shaft 225 away from the second motor 21 is rotatably supported on the housing 228 of the second gear reduction mechanism 22 through a bearing. An end of the second output shaft 225 close to the second motor 21 is rotatably supported on an intermediate support structure 2281 of the second gear reduction mechanism 22 through a bearing. The intermediate support structure 2281 is located in the housing 228.

Refer to FIG. 2 and FIG. 3. The first gear reduction mechanism 12 and the second gear reduction mechanism 22 are arranged/disposed in different forms. An angle between a vertical line L1 between a center line of the first input shaft 124 and a center line of the first intermediate shaft 126 and a vertical line L2 between a center line of the first output shaft 125 and the center line of the first intermediate shaft 126 is greater than 90 degrees. An angle between a vertical line L3 between a center line of the second input shaft 224 and a center line of the third intermediate shaft 226 and a vertical line between a center line of the second output shaft 225 and the center line of the third intermediate shaft 226 is less than 90 degrees. In First Embodiment, the second input shaft 224 and the second output shaft 225 are coaxial. The vertical line L3 between the center line of the second input shaft 224 and the center line of the third intermediate shaft 226 overlaps the vertical line between the center line of the second output shaft 225 and the center line of the third intermediate shaft 226, in other words, the angle is 0.

In First Embodiment, refer to FIG. 1. A locking mechanism 3 is arranged/disposed between the first wheel drive assembly 1 and the second wheel drive assembly 2, and the locking mechanism 3 is switchable between an engagement position and a disengagement position of the locking mechanism. When the locking mechanism 3 is switched to the engagement position, the first motor 11 is in power coupling with the second motor 21. When the locking mechanism 3 is switched to the disengagement position, the power coupling between the first motor 11 and the second motor 21 is interrupted.

In First Embodiment, the motor shaft of the first motor 11 uses a single-ended output mode to output a first single-ended output, the motor shaft of the second motor 21 uses a single-ended output mode to output a second single-ended output, and the locking mechanism 3 is arranged/disposed between the wheel shaft 2001 of the first wheel 200 and the wheel shaft 3001 of the second wheel 300, in other words, the locking mechanism 3 is arranged/disposed on a transmission tail end.

The motor shaft of the second motor 21 is a hollow shaft. An end of the first output shaft 125 away from the first wheel 200 is connected to one end of the locking mechanism 3 through a motor connecting shaft 4 that passes through the second motor 21, and the other end of the locking mechanism 3 is connected to an end of the second output shaft 225. In this way, the locking mechanism 3 is connected between the wheel shaft 2001 of the first wheel 200 and the wheel shaft 3001 of the second wheel 300. The first output shaft 125, the connecting shaft 4, and the second output shaft 225 are coaxial. When the locking mechanism 3 is switched to the engagement position, the wheel shaft 2001 of the first wheel 200 is connected to the wheel shaft 3001 of the second wheel 300 through the first output shaft 125, the connecting shaft 4, the locking mechanism 3, and the second output shaft 225, so that the first motor 11 is in power coupling with the second motor 21. When the locking mechanism 3 is switched to the disengagement position, the wheel shaft 2001 of the first wheel 200 is disconnected from the wheel shaft 3001 of the second wheel 300, so that the power coupling between the first motor 11 and the second motor 21 is interrupted.

There are the following several advantages by arranging the locking mechanism 3.

(1) When wheels on one side enter a slippery road or get stuck in a mud pit, the locking mechanism can be engaged to output all torque of two motors to wheels on the other side, to realize a differential lock function, thereby having a strong ability to get out of trouble.

(2) Combined with a driving condition of the entire vehicle, by controlling engagement and disengagement of the locking mechanism, switching between a single motor drive mode and a dual motor independent drive mode can be realized, to ensure that the motors work in a high-efficiency range as much as possible, save energy consumption, and improve an endurance mileage of the vehicle.

(3) When a failure occurs on motors on one side, the locking mechanism can be engaged to ensure that motors that normally work on the other side simultaneously drive two wheels, to realize a low-speed limp function.

(4) The locking mechanism is designed on the transmission tail end and is arranged/disposed on an axis of the second motor. A force of a ground on one wheel is directly transmitted to another wheel shaft through a wheel shaft and the locking mechanism, which does not generate loads on gears of the first gear reduction mechanism and the second gear reduction mechanism. In this way, the loads on the gears of the first gear reduction mechanism and the second gear reduction mechanism can be effectively reduced, to reduce requirements on radial sizes of the gears, thereby increasing a ground clearance and improving trafficability.

When a (four-wheel drive) vehicle using the electric drive assembly 100 in this embodiment selects to use a two-wheel drive mode, the first disengaging mechanism 13 and the second disengaging mechanism 23 that disconnect a front shaft or a rear shaft of the electric drive assembly 100 can reduce or interrupt drag resistance when the first motor 11 and the first gear reduction mechanism 12, and the second motor 21 and the second gear reduction mechanism 22 rotate along with the wheels, and improve economy and an endurance mileage of the entire vehicle.

A position of the first disengaging mechanism 13 is not limited to the second intermediate shaft 127. For example, in an alternative embodiment of First Embodiment, the first disengaging mechanism 13 is arranged/disposed on the first input shaft 124. In this case, the first driving gear 1211 is an idler gear, and other gear gears are fixed gears.

In another alternative embodiment of First Embodiment, the first disengaging mechanism 13 is arranged/disposed on the first output shaft 125. In this case, the third driven gear 1232 is an idler gear, and other gear gears are fixed gears.

In another alternative embodiment of First Embodiment, the first disengaging mechanism 13 is arranged/disposed on the first intermediate shaft 126. In this case, one of the first driven gear 1212 and the second driving gear 1221 is an idler gear, and other gear gears are fixed gears.

Second Embodiment

In Second Embodiment of the present disclosure, an electric drive assembly is provided. A difference between the electric drive assembly and that in First Embodiment lies in that, the locking mechanism between the first wheel drive assembly and the second wheel drive assembly is canceled.

Compared with First Embodiment, in Second Embodiment, components are reduced, and costs are lower, so that a vehicle that does not need a very strong ability of get out of trouble is applicable.

Third Embodiment

Figure 4:
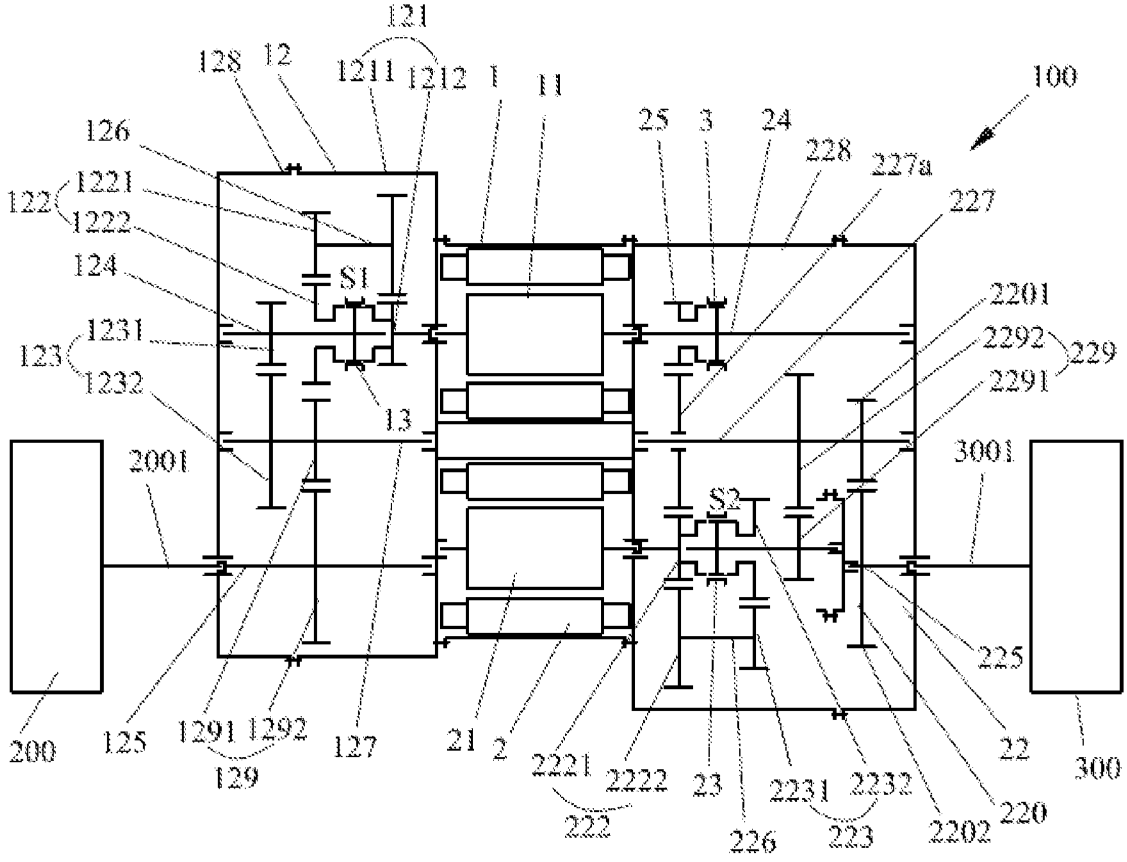
FIG. 4 is a schematic diagram of an electric drive assembly according to Third Embodiment of the present disclosure.

FIG. 4 shows an electric drive assembly 100 according to Third Embodiment of the present disclosure. A main difference between Third Embodiment and First Embodiment lies in that, a first gear reduction mechanism 12 and a second gear reduction mechanism 22 are two gear multi-level gear reducers.

The first gear reduction mechanism 12 is a two gear three-level gear reduction mechanism. An engagement position of a first disengaging mechanism 13 includes a first engagement position and a second engagement position. When the first disengaging mechanism 13 is switched to the first engagement position, power of a first motor 11 is transmitted to a first wheel 200 through a first gear transmission path of the first gear reduction mechanism 12. When the first disengaging mechanism 13 is switched to the second engagement position, the power of the first motor 11 is transmitted to the first wheel 200 through a second gear transmission path of the first gear reduction mechanism 12. The second gear reduction mechanism 22 has two drive gear positions, and an engagement position of a second disengaging mechanism 23 includes a first engagement position and a second engagement position. When the second disengaging mechanism 23 is switched to the first engagement position, power of a second motor 21 is transmitted to a second wheel 300 through a first gear transmission path of the second gear reduction mechanism 22. When the second disengaging mechanism 23 is switched to the second engagement position, the power of the second motor 21 is transmitted to the second wheel 300 through a second gear transmission path of the second gear reduction mechanism 22.

The first gear reduction mechanism 12 includes a first reduction gear set 121, a second reduction gear set 122, a third reduction gear set 123, a fourth reduction gear set 129, a first input shaft 124, a first output shaft 125, a first intermediate shaft 126, and a second intermediate shaft 127. The first reduction gear set 121 includes a first driving gear 1211 and a first driven gear 1212 that are meshed with each other. The second reduction gear set 122 includes a second driving gear 1221 and a second driven gear 1222 that are meshed with each other. The third reduction gear set 123 includes a third driving gear 1231 and a third driven gear 1232 that are meshed with each other. The fourth reduction gear set 129 includes a fourth driving gear 1291 and a fourth driven gear 1292 that are meshed with each other. The first input shaft 124 is connected to the first motor 11, the first output shaft 125 is connected to a wheel shaft 2001 of the first wheel 200, the first driving gear 1211, the second driven gear 1222, and the third driving gear 1231 are arranged/disposed on the first input shaft 124, the first driven gear 1212 and the second driving gear 1221 are arranged/disposed on the first intermediate shaft 126, the third driven gear 1232 and the fourth driving gear 1291 are arranged/disposed on the second intermediate shaft 127, and the fourth driven gear 1292 is arranged/disposed on the first output shaft 125. The second driven gear 1222 is an idler gear that is sleeved on the first input shaft 124, and remaining gear gears are fixed gears that are fixed on shafts on which the remaining gear gears are located.

The first input shaft 124 is divided into two sections at the first disengaging mechanism 13. A first section of the first input shaft 124 is connected to the first motor 11, and the first driving gear 1211 is fixed on the first section of the first input shaft 124. The second driven gear 1222 is sleeved on a second section of the first input shaft 124, and the third driving gear 1231 is fixed on the second section of the first input shaft 124.

The first disengaging mechanism 13 is a first synchronizer S1, and the first synchronizer S1 is arranged/disposed between the first driving gear 1211 and the second driven gear 1222. The first synchronizer S1 can be selectively engaged with and disengaged from the first driving gear 1211 and the second driven gear 1222.

When the first synchronizer S1 is engaged with the first driving gear 1211 (hangs to a right position), the power of the first motor 11 can sequentially pass through the first input shaft 124, the first synchronizer S1, the third reduction gear set 123, the fourth reduction gear set 129, and the first output shaft 125 (the first gear power transmission path) to be transmitted to the first wheel 200. When the first synchronizer S1 is engaged with the second driven gear 1222 (hangs to a left position), the power of the first motor 11 can sequentially pass through the first input shaft 124, the first reduction gear set 121, the second reduction gear set 122, the third reduction gear set 123, the fourth reduction gear set 129, and the first output shaft 125 (the second gear power transmission path) to be transmitted to the first wheel 200. When the first synchronizer S1 is disengaged from the first driving gear 1211 and the second driven gear 1222 (hangs to a neutral position), a power transmission path from the first motor 11 to the first wheel 200 is disconnected at the first synchronizer S1. A speed ratio of the first gear power transmission path is less than a speed ratio of the second gear power transmission path.

The second gear reduction mechanism 22 is a two gear three-level gear reduction mechanism. The second gear reduction mechanism 22 includes a fifth reduction gear set 222, a sixth reduction gear set 223, a seventh reduction gear set 229, an eighth reduction gear set 220, a second input shaft 224, a second output shaft 225, a third intermediate shaft 226, and a fourth intermediate shaft 227. The fifth reduction gear set 222 includes a fifth driving gear 2221 and a fifth driven gear 2222 that are meshed with each other. The sixth reduction gear set 223 includes a sixth driving gear 2231 and a sixth driven gear 2232 that are meshed with each other. The seventh reduction gear set 229 includes a seventh driving gear 2291 and a seventh driven gear 2292 that are meshed with each other. The eighth reduction gear set 220 includes an eighth driving gear 2201 and an eighth driven gear 2202 that are meshed with each other. The second input shaft 224 is connected to the second motor 21, the second output shaft 225 is connected to a wheel shaft 3001 of the second wheel 300, the fifth driving gear 2221, the sixth driven gear 2232, and the seventh driving gear 2241 are arranged/disposed on the second input shaft 224, the fifth driven gear 2222 and the sixth driving gear 2231 are arranged/disposed on the third intermediate shaft 226, the seventh driven gear 2292 and the eighth driving gear 2201 are arranged/disposed on the fourth intermediate shaft 227, and the eighth driven gear 2202 is arranged/disposed on the second output shaft 225. The sixth driven gear 2232 is an idler gear that is sleeved on the second input shaft 224, and remaining gear gears are fixed gears that are fixed on shafts on which the remaining gear gears are located.

The second input shaft 224 is divided into two sections at the second disengaging mechanism 23. A first section of the second input shaft 224 is connected to the second motor 21, and the fifth driving gear 2221 is fixed on the first section of the second input shaft 224. The sixth driven gear 2232 is sleeved on a second section of the second input shaft 224, and the seventh driving gear 2291 is fixed on the second section of the second input shaft 224.

The second disengaging mechanism 23 is a second synchronizer S2, and the second synchronizer S2 is arranged/disposed between the fifth driving gear 2221 and the sixth driven gear 2232. The second synchronizer S2 can be selectively engaged with and disengaged from the fifth driving gear 2221 and the sixth driven gear 2232.

When the second synchronizer S2 is engaged with the fifth driving gear 2221 (hangs to a right position), the power of the second motor 21 can sequentially pass through the second input shaft 224, the second synchronizer, the seventh reduction gear set 229, the eighth reduction gear set 220, and the second output shaft 225 (the first gear power transmission path) to be transmitted to the second wheel 300. When the second synchronizer S2 is engaged with the sixth driven gear 2232 (hangs to a left position), the power of the second motor 21 can sequentially pass through the second input shaft 224, the fifth reduction gear set 222, the sixth reduction gear set 223, the seventh reduction gear set 229, the eighth reduction gear set 220, and the second output shaft 225 (the second gear power transmission path) to be transmitted to the second wheel 300. When the second synchronizer S2 is disengaged from the fifth driving gear 2221 and the sixth driven gear 2232 (hangs to a neutral position), a power transmission path from the second motor 21 to the second wheel 300 is disconnected at the second synchronizer. A speed ratio of the first gear power transmission path is less than a speed ratio of the second gear power transmission path.

In Third Embodiment, the first gear reduction mechanism 12 and the second gear reduction mechanism 22 are arranged/disposed in different forms. An angle between a vertical line between a center line of the first input shaft 124 and a center line of the first intermediate shaft 126 and a vertical line between a center line of the first output shaft 125 and the center line of the first intermediate shaft 126 is greater than 90 degrees. An angle between a vertical line between a center line of the second input shaft 224 and a center line of the third intermediate shaft 226 and a vertical line between a center line of the second output shaft 225 and the center line of the third intermediate shaft 226 is less than 90 degrees. In Second Embodiment, the second input shaft 224 and the second output shaft 225 are not coaxial (spaced in parallel). The angle between the vertical line between the center line of the second input shaft 224 and the center line of the third intermediate shaft 226 and the vertical line between the center line of the second output shaft 225 and the center line of the third intermediate shaft 226 is an acute angle.

In Third Embodiment, a motor shaft of the first motor 11 uses a double-ended output mode to output a double-ended output, a motor shaft of the second motor 21 uses a single-ended output mode to output a single-ended output, and a locking mechanism 3 is arranged/disposed at a second output end of the motor shaft of the first motor 11. A first output end of the motor shaft of the first motor 11 is in transmission connection to the first wheel 200 through the first gear reduction mechanism 12, and an output end of the motor shaft of the second motor 21 is in transmission connection to the second wheel 300 through the second gear reduction mechanism 22. When the locking mechanism 3 is switched to an engagement position, the second output end of the motor shaft of the first motor 11 is in transmission connection to the second gear reduction mechanism 22, so that the first motor 11 is in power coupling with the second motor 21. When the locking mechanism 3 is switched to a disengagement position, the second output end of the motor shaft of the first motor 11 is disconnected from the second gear reduction mechanism 22, so that power coupling between the first motor 11 and the second motor 21 is interrupted.

In an embodiment, the second wheel drive assembly 2 further includes a locking shaft 24 and a locking gear 25 that is sleeved on the locking shaft 24. The locking shaft 24 is connected to the second output end of the motor shaft of the first motor 11, and the locking mechanism 3 is arranged/disposed on a side of the locking gear 25. A second intermediate gear **227*a* meshed with the locking gear 25 is further sleeved on the fourth intermediate shaft 227, and the second intermediate gear 227*a* is meshed with the fifth driving gear 2221. When the locking mechanism 3 is switched to the engagement position, the locking gear 25 is connected to the locking shaft 24, so that the first motor 11 is in power coupling with the second motor 21 at the second input shaft 224 through the locking gear 25, the second intermediate gear 227*a*, and the fifth driving gear 2221. When the locking mechanism 3 is switched to the disengagement position, the locking gear 25 is disconnected from the locking shaft 24, so that the power coupling between the first motor 11 and the second motor 21** is interrupted.

In Third Embodiment, the second motor 21 uses one end to output, and drives the second wheel 300 through the second gear reduction mechanism 22. However, the first output end of the first motor 11 drives the first wheel 200 through the first gear reduction mechanism 12, and the second output end of the first motor 11 drives the second wheel 300 through the locking mechanism 3 and the second gear reduction mechanism 22.

When the first wheel 200 sinks, the locking mechanism 3 is closed, so that the first motor 11 and the second motor 21 simultaneously drive the second wheel 300 in parallel to get out of trouble. When the second wheel 300 sinks, the locking mechanism 3 is closed, so that the second motor 21 is connected in series with the first motor 11 to drive the first wheel 200 to get out of trouble.

When the second motor 21 fails, the locking mechanism 3 is closed, so that the two output ends of the first motor 11 respectively drive the first wheel 200 and the second wheel 300 simultaneously to realize a low-speed limp function. When the first motor 11 fails, the locking mechanism 3 is closed, so that one end of the second motor 21 drives through two paths, to be specific, drives the second wheel 300 through one path: the second gear reduction mechanism 22; and drives the first wheel 200 through the other path: the locking mechanism 3, a rotor of the first motor 11, and the first gear reduction mechanism 12, to realize the low-speed limp function.

Compared with a single gear reduction solution of First Embodiment, in the two gear reduction solution of Third Embodiment, a low gear (first gear) can increase wheel end torque and improve acceleration and climbing ability of a vehicle, and a high-speed gear (second gear) can guarantee a maximum speed of the vehicle. The two gear solution can adjust landing points of motors, to try to ensure that the motors work in a high-efficiency zone, and improve economy. In addition, when a synchronizer hangs to a neutral gear (neutral position), decoupling between the motors and wheels can be realized, drag resistance can be reduced, and an endurance mileage of the vehicle can be improved.

In Third Embodiment, the locking mechanism 3 is arranged/configured as a synchronizer integrating with a one-way clutch, and the one-way clutch is connected between the synchronizer and the locking shaft 24. An advantage of the synchronizer integrating with the one-way clutch lies in that, the first motor 11 reverses before the locking mechanism 3 is engaged, and the one-way clutch disconnects the locking shaft 24 from the second wheel 300, to be conducive to smooth engagement between an engaging sleeve of the synchronizer and an engaging gear ring, and greatly reduce execution torque required when locking, thereby improving riding comfort of the vehicle.

In some alternative embodiments of Third Embodiment, the locking mechanism may also be canceled.

In some alternative embodiments of Third Embodiment, the locking mechanism 3 is arranged/configured as a synchronizer integrating with a torsional disk. In other words, the one-way clutch is replaced with the torsional disk, to realize a similar function.

Fourth Embodiment

Figure 5:
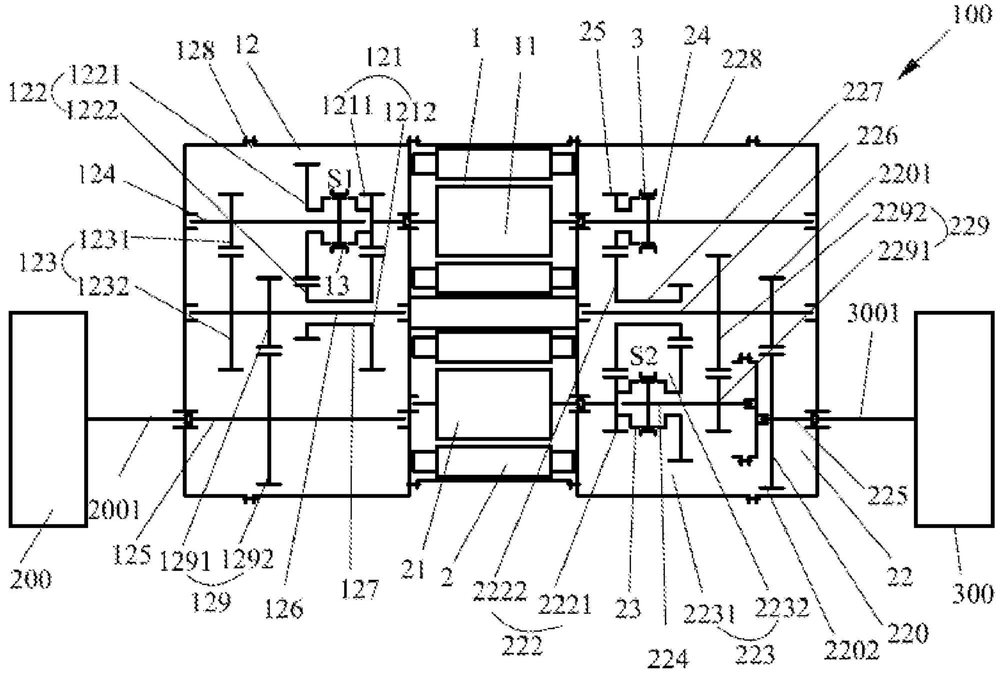
FIG. 5 is a schematic diagram of an electric drive assembly according to Fourth Embodiment of the present disclosure.

FIG. 5 shows an electric drive assembly 100 according to Fourth Embodiment of the present disclosure. One difference between Fourth Embodiment and Third Embodiment lies in that, a second intermediate shaft 127 is a hollow shaft sleeved on a first intermediate shaft 126.

In Fourth Embodiment, the second intermediate shaft 127 is coaxially sleeved on the first intermediate shaft 126, which can reduce an X-directional size of a first gear reduction mechanism 12.

Another difference between Fourth Embodiment and Third Embodiment lies in that, a fourth intermediate shaft 227 of a second gear reduction mechanism 22 is coaxially sleeved on a third intermediate shaft 226, and a locking gear 25 is meshed with a fifth driven gear 2222, which are equivalent to that a second intermediate gear **227*a*** is omitted. In this way, the X-directional size of the first gear reduction mechanism can be reduced.

Fifth Embodiment

Figure 6:
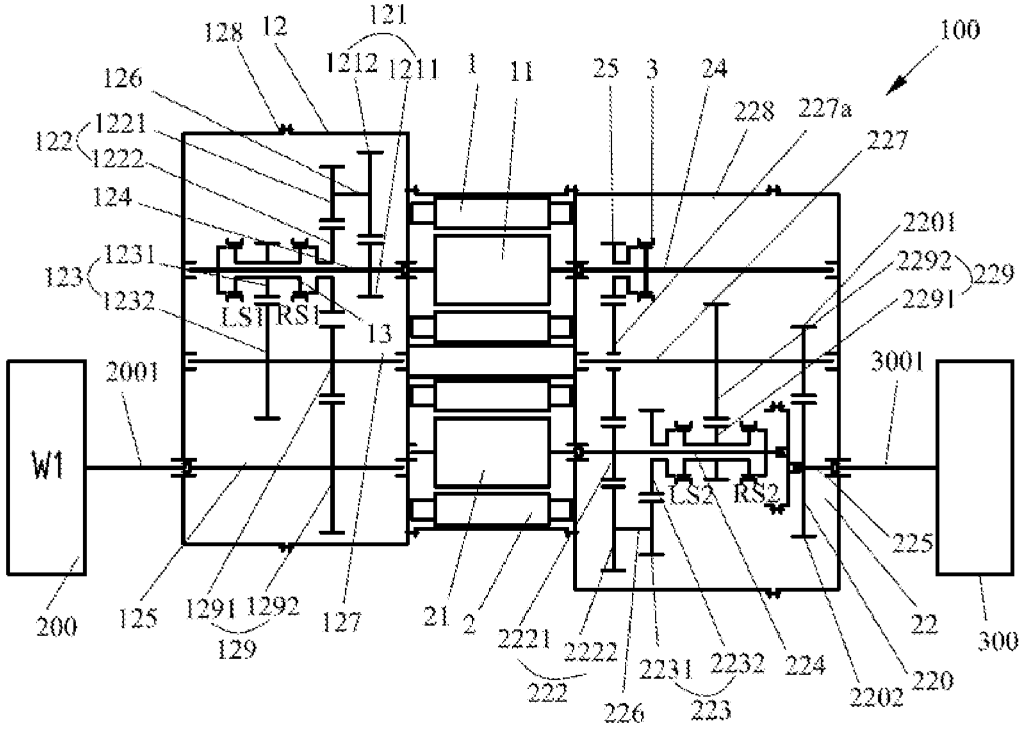
FIG. 6 is a schematic diagram of an electric drive assembly according to Fifth Embodiment of the present disclosure.

FIG. 6 shows an electric drive assembly 100 according to Fifth Embodiment of the present disclosure. One difference between Fifth Embodiment and Third Embodiment lies in that, a first disengaging mechanism 13 has different structure and arrangement.

In Fifth Embodiment, a first gear reduction mechanism 12 includes a first reduction gear set 121, a second reduction gear set 122, a third reduction gear set 123, a fourth reduction gear set 129, a first input shaft 124, a first output shaft 125, a first intermediate shaft 126, and a second intermediate shaft 127. The first reduction gear set 121 includes a first driving gear 1211 and a first driven gear 1212 that are meshed with each other. The second reduction gear set 122 includes a second driving gear 1221 and a second driven gear 1222 that are meshed with each other. The third reduction gear set 123 includes a third driving gear 1231 and a third driven gear 1232 that are meshed with each other. The fourth reduction gear set 129 includes a fourth driving gear 1291 and a fourth driven gear 1292 that are meshed with each other. The first input shaft 124 is connected to a first motor 11, the first output shaft 125 is connected to a wheel shaft 2001 of a first wheel 200, the first driving gear 1211 is fixed on the first input shaft 124, the second driven gear 1222 is sleeved on the first input shaft 124, the first driven gear 1212 and the second driving gear 1221 are fixed on the first intermediate shaft 126, the second intermediate shaft 127 is a hollow shaft sleeved on the first intermediate shaft 126, the third driving gear 1231 is fixed on the second intermediate shaft 127, the third driven gear 1232 and the fourth driving gear 1291 are fixed on the second intermediate shaft 127, and the fourth driven gear 1292 is fixed on the first output shaft 125.

The first disengaging mechanism 13 includes a first left synchronizer LS1 and a first right synchronizer RS1. The first left synchronizer LS1 is connected between one end of the first intermediate shaft 126 and the first input shaft 124, to control connection and disconnection between the first intermediate shaft 126 and the first input shaft 124. The first right synchronizer RS1 is connected between the other end of the first intermediate shaft 126 and the second driven gear 1222, to control connection and disconnection between the first intermediate shaft 126 and the second driven gear 1222.

In Fifth Embodiment, the second intermediate shaft 127 is coaxially sleeved on the first intermediate shaft 126, which can reduce an X-directional size of the first gear reduction mechanism 12.

In addition, the first input shaft 124 is an entire shaft without disconnection in the middle, which is equivalent to that a shaft is reduced, so that the assembly is simpler.

Another difference between Fifth Embodiment and Third Embodiment lies in that, a second disengaging mechanism 23 has different structure and arrangement.

In an embodiment, a second gear reduction mechanism 22 includes a fifth reduction gear set 222, a sixth reduction gear set 223, a seventh reduction gear set 229, an eighth reduction gear set 220, a second input shaft 224, a second output shaft 225, a third intermediate shaft 226, and a fourth intermediate shaft 227. The fifth reduction gear set 222 includes a fifth driving gear 2221 and a fifth driven gear 2222 that are meshed with each other. The sixth reduction gear set 223 includes a sixth driving gear 2231 and a sixth driven gear 2232 that are meshed with each other. The seventh reduction gear set 229 includes a seventh driving gear 2291 and a seventh driven gear 2292 that are meshed with each other. The eighth reduction gear set 220 includes an eighth driving gear 2201 and an eighth driven gear 2202 that are meshed with each other. The second input shaft 224 is connected to a second motor 21, the second output shaft 225 is connected to a wheel shaft 3001 of a second wheel 300, the fifth driving gear 2221 is fixed on the second input shaft 224, the fifth driven gear 2222 and the sixth driving gear 2261 are fixed on the third intermediate shaft 226, the sixth driven gear 2262 and the seventh driving gear 2291 are sleeved on the second input shaft 224, the seventh driven gear 2292 and the eighth driving gear 2201 are fixed on the second intermediate shaft 127, and the eighth driven gear 2202 is fixed on the second output shaft 225.

The second disengaging mechanism 23 includes a second left synchronizer LS2 and a second right synchronizer RS2. The second left synchronizer LS2 is located between the sixth driven gear 2262 and the seventh driving gear 2291, to control connection and disconnection between the sixth driven gear 2262 and the seventh driving gear 2291 and the second input shaft 224. The second right synchronizer RS2 is connected to another end of the seventh driving gear 2291, to control connection and disconnection between the seventh driving gear 2291 and the second input shaft 224.

Sixth Embodiment

Figure 7:
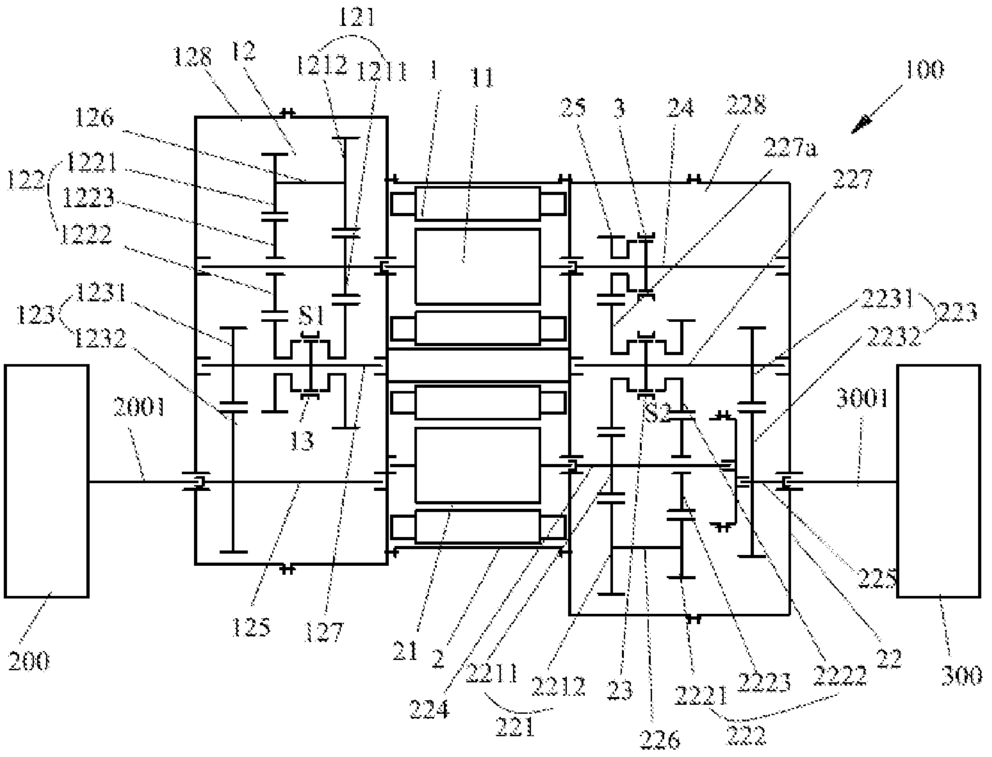
FIG. 7 is a schematic diagram of an electric drive assembly according to Sixth Embodiment of the present disclosure.

FIG. 7 shows an electric drive assembly 100 according to Sixth Embodiment of the present disclosure. One difference between Sixth Embodiment and Third Embodiment lies in that, a first disengaging mechanism and a first gear reduction mechanism are arranged/disposed in different manners.

A first gear reduction mechanism 12 includes a first reduction gear set 121, a second reduction gear set 122, a third reduction gear set 123, a first input shaft 124, a first output shaft 125, a first intermediate shaft 126, and a second intermediate shaft 127. The first reduction gear set 121 includes a first driving gear 1211 and a first driven gear 1212 that are meshed with each other. The second reduction gear set 122 includes a second driving gear 1221, a second driven gear 1222, and a first transition gear 1223, and the first transition gear 1223 is simultaneously meshed with the second driving gear 1221 and the second driven gear 1222. The third reduction gear set 123 includes a third driving gear 1231 and a third driven gear 1232 that are meshed with each other. The first input shaft 124 is connected to a first motor 11, the first output shaft 125 is connected to a wheel shaft 2001 of a first wheel 200, the first driving gear 1211 is fixed on the first input shaft 124, the first transition gear 1223 is sleeved on the first input shaft 124, the second driven gear 1222 is sleeved on the second intermediate shaft 127, the first driven gear 1212 and the second driving gear 1221 are fixed on the first intermediate shaft 126, the third driving gear 1231 is fixed on the second intermediate shaft 127, and the third driven gear 1232 is fixed on the first output shaft 125.

A first intermediate gear 127*a* is further sleeved on the second intermediate shaft 127, and a first disengaging mechanism 13 includes a first synchronizer S1. The first synchronizer S1 is arranged/disposed on the second intermediate shaft 127 and is located between the first intermediate gear 127*a* and the second driven gear 1222. The first synchronizer S1 is selectively connected to and disconnected from the first intermediate gear 127*a* and the second driven gear 1222, to control connection and disconnection between the first intermediate gear 127*a* and the second driven gear 1222 and the second intermediate shaft 127 to realize two gears.

In Sixth Embodiment, the first input shaft 124 is an entire shaft without disconnection in the middle, which is equivalent to that a shaft is reduced, so that the assembly is simpler.

Another difference between Sixth Embodiment and Third Embodiment lies in that, a second disengaging mechanism and a second gear reduction mechanism are arranged/disposed in different manners.

In an embodiment, a second gear reduction mechanism 22 includes a fourth reduction gear set 221, a fifth reduction gear set 222, a sixth reduction gear set 223, a second input shaft 224, a second output shaft 225, a third intermediate shaft 226, and a fourth intermediate shaft 227. The fourth reduction gear set 221 includes a fourth driving gear 2211 and a fourth driven gear 2212 that are meshed with each other. The fifth reduction gear set 222 includes a fifth driving gear 2221 and a fifth driven gear 2222 that are meshed with each other, and a second transition gear 2223 meshed between the fifth driving gear 2221 and the fifth driven gear 2222. The sixth reduction gear set 223 includes a sixth driving gear 2231 and a sixth driven gear 2232 that are meshed with each other. The second transition gear 2223 is sleeved on the second input shaft 224. The second input shaft 224 is connected to a second motor 21, the second output shaft 225 is connected to a wheel shaft 3001 of a second wheel 300, the fourth driving gear 2211 is fixed on the second input shaft 224, the fourth driven gear 2212 and the fifth driving gear 2221 are fixed on the third intermediate shaft 226, the fifth driven gear 2222 is sleeved on the fourth intermediate shaft 227, the sixth driving gear 2231 is fixed on the second intermediate shaft 127, and the sixth driven gear 2232 is fixed on the second output shaft 225.

A second disengaging mechanism 23 includes a second synchronizer S2. The second synchronizer S2 is located between the fifth driven gear 2222 and a second intermediate gear 227*a*, to control connection and disconnection between the fifth driven gear 2222 and the second intermediate gear 227*a* and the fourth intermediate shaft 227.

Seventh Embodiment

Figure 8:
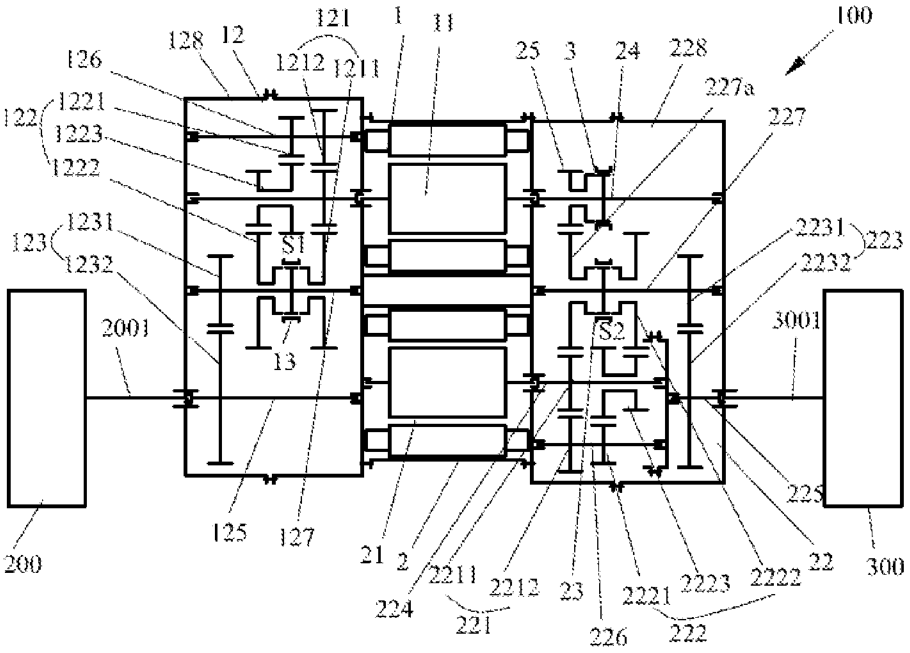
FIG. 8 is a schematic diagram of an electric drive assembly according to Seventh Embodiment of the present disclosure.

FIG. 8 shows an electric drive assembly 100 according to Seventh Embodiment of the present disclosure. One difference between Seventh Embodiment and Sixth Embodiment lies in that, a first transition gear 1223 is a duplicate gear. A duplicate gear with a large diameter is meshed with a second driving gear 1221, and a duplicate gear with a small diameter is meshed with a second driven gear 1222.

One difference between Seventh Embodiment and Sixth Embodiment lies in that, a second transition gear 2223 is a duplicate gear. A duplicate gear with a large diameter is meshed with a fifth driving gear 2221, and a duplicate gear with a small diameter is meshed with a fifth driven gear 2222.

By using the duplicate gears, sizes of the first transition gear 1223 and the second transition gear 2223 can be reduced, to reduce occupation of X-directional space of the electric drive assembly 100.

Eighth Embodiment

Figure 9:
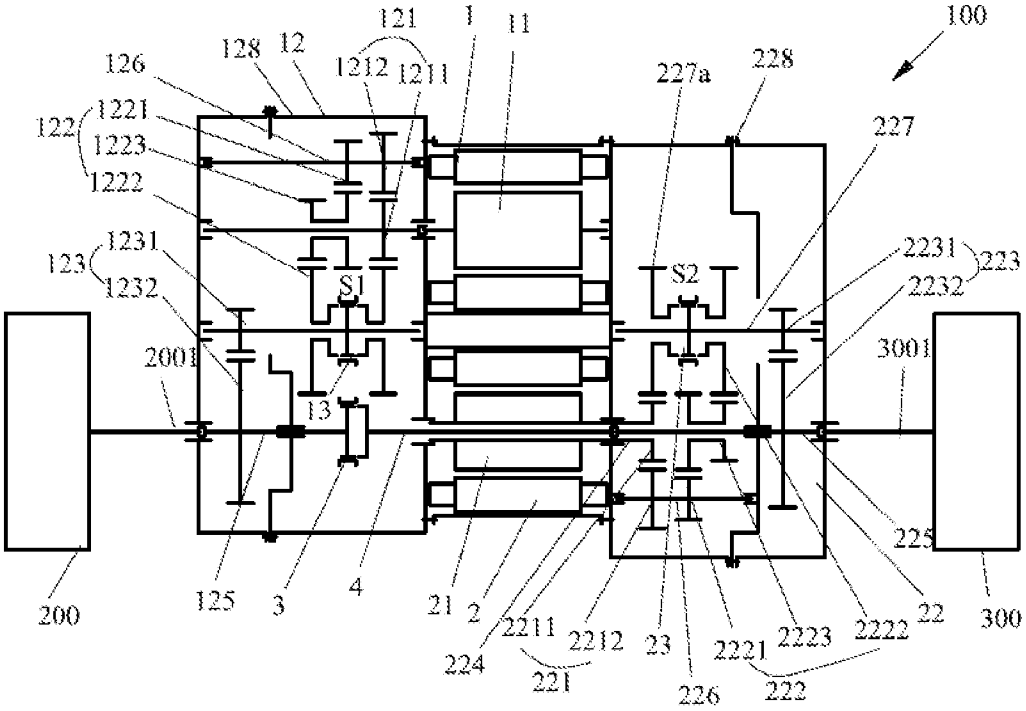
FIG. 9 is a schematic diagram of an electric drive assembly according to Eighth Embodiment of the present disclosure.

FIG. 9 shows an electric drive assembly 100 according to Eighth Embodiment of the present disclosure. A main difference between Eighth Embodiment and Seventh Embodiment lies in that, a locking mechanism 3 is arranged/disposed in a different manner.

In Eighth Embodiment, a motor shaft of a first motor 11 uses a single-ended output mode to output a single-ended output, a motor shaft of a second motor 21 uses a double-ended output mode to output a double-ended output, and the locking mechanism 3 is arranged/disposed between a wheel shaft 2001 of a first wheel 200 and a wheel shaft 3001 of a second wheel 300, in other words, the locking mechanism 3 is arranged/disposed on a transmission tail end.

The motor shaft of the second motor 21 is a hollow shaft. An end of a second output shaft 225 away from the second wheel 300 is connected to one end of the locking mechanism 3 through a connecting shaft 4, and the other end of the locking mechanism 3 is connected to an end of a first output shaft 125. In this way, the locking mechanism 3 is connected between the wheel shaft 2001 of the first wheel 200 and the wheel shaft 3001 of the second wheel 300.

When the locking mechanism 3 is switched to an engagement position, a second output end of the motor shaft of the second motor 21 is in transmission connection to a first gear reduction mechanism 12 (e.g., the first output shaft 125), so that the first motor 11 is in power coupling with the second motor 21. When the locking mechanism 3 is switched to a disengagement position, the second output end of the motor shaft of the second motor 21 is disconnected from the first gear reduction mechanism 12, so that power coupling between the first motor 11 and the second motor 21 is interrupted.

Ninth Embodiment

Figure 10:
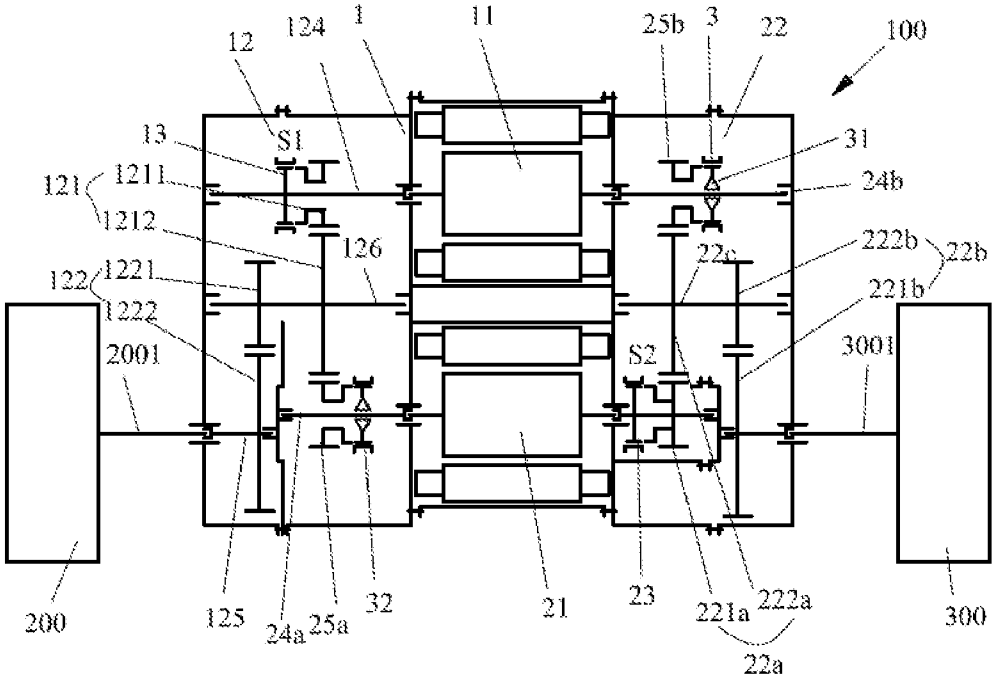
FIG. 10 is a schematic diagram of an electric drive assembly according to Ninth Embodiment of the present disclosure.

FIG. 10 shows an electric drive assembly 100 according to Ninth Embodiment of the present disclosure.

In Ninth Embodiment, a motor shaft of a first motor 11 uses a double-ended output mode to output a first double-ended output, a motor shaft of a second motor 21 uses a double-ended output mode to output a second double-ended output, and a locking mechanism 3 includes a first locking mechanism 31 and a second locking mechanism 32. A first output end of the motor shaft of the first motor 11 is in transmission connection to a first wheel 200 through a first gear reduction mechanism 12, a second output end of the motor shaft of the first motor 11 is connected to a second gear reduction mechanism 22 through a first locking mechanism 31, a first output end of the motor shaft of the second motor 21 is in transmission connection to a second wheel 300 through the second gear reduction mechanism 22, and a second output end of the motor shaft of the second motor 21 is connected to the first gear reduction mechanism 12 through the second locking mechanism 32.

When the first locking mechanism 31 is switched to an engagement position and the second locking mechanism 32 is switched to an engagement position, the second output end of the motor shaft of the first motor 11 is in transmission connection to the second gear reduction mechanism 22 and drives the second wheel 300, and the second output end of the motor shaft of the second motor 21 is in transmission connection to the first gear reduction mechanism 12 and drives the first wheel 200, so that the first motor 11 is in power coupling with the second motor 21, to jointly drive the first wheel 200 and the second wheel 300. When the first locking mechanism 31 is switched to the engagement position and the second locking mechanism 32 is switched to a disengagement position, the second output end of the motor shaft of the first motor 11 is in transmission connection to the second gear reduction mechanism 22 and drives the second wheel 300, and the second output end of the motor shaft of the second motor 21 is disconnected from the first gear reduction mechanism 12, so that the first motor 11 is in power coupling with the second motor 21, to jointly drive the second wheel 300. When the first locking mechanism 31 is switched to a disengagement position and the second locking mechanism 32 is switched to the engagement position, the second output end of the motor shaft of the second motor 21 is in transmission connection to the first gear reduction mechanism 12, and the second output end of the motor shaft of the first motor 11 is disconnected from the second gear reduction mechanism 22, so that the first motor 11 is in power coupling with the second motor 21, to jointly drive the first wheel 200. When the first locking mechanism 31 is switched to the disengagement position and the second locking mechanism 32 is switched to the disengagement position, the second output end of the motor shaft of the first motor 11 is disconnected from the second gear reduction mechanism 22, and the second output end of the motor shaft of the second motor 21 is disconnected from the first gear reduction mechanism 12, so that power coupling between the first motor 11 and the second motor 21 is interrupted.

The first gear reduction mechanism 12 is a single gear two-level reduction mechanism. The first gear reduction mechanism 12 includes a first reduction gear set 121, a second reduction gear set 122, a first input shaft 124, a first output shaft 125, and a first intermediate shaft 126. The first reduction gear set 121 includes a first driving gear 1211 and a first driven gear 1212 that are meshed with each other. The second reduction gear set 122 includes a second driving gear 1221 and a second driven gear 1222 that are meshed with each other. The first input shaft 124 is connected to the first output end of the first motor 11, the first output shaft 125 is connected to a wheel shaft 2001 of the first wheel 200, the first driving gear 1211 is sleeved on the first input shaft 124, the first driven gear 1212 and the second driving gear 1221 are fixed on the first intermediate shaft 126, and the second driven gear 1222 is fixed on the first output shaft 125.

The second gear reduction mechanism 22 is a single gear two-level reduction mechanism. The second gear reduction mechanism 22 includes a third reduction gear set **22*a*, a fourth reduction gear set 22*b*, a second input shaft 224, a second output shaft 225, and a second intermediate shaft 22*c*. The third reduction gear set 22*a* includes a third driving gear 221*a* and a third driven gear 222*a* that are meshed with each other. The fourth reduction gear set 22*b* includes a fourth driving gear 221*b* and a fourth driven gear 222*b* that are meshed with each other. The second input shaft 224 is connected to the other output end of the first motor 11, the second output shaft 225 is connected to a wheel shaft 3001 of the second wheel 300, the third driving gear 221*a* is sleeved on the second input shaft 224, the third driven gear 222*a* and the fourth driving gear 221*b* are fixed on the second intermediate shaft 22*c*, and the fourth driven gear 222*b* is fixed on the second output shaft 225**.

A first wheel drive assembly 1 further includes a first locking shaft **24*a* and a first locking gear 25*a* that is sleeved on the first locking shaft 24***a*. The first locking shaft 24*a* is connected to an output end of the second motor 21, the first locking mechanism 31 is arranged/disposed on a side of the first locking gear 25*a*, and the first locking gear 25*a* is meshed with the first driven gear 1212.

A second wheel drive assembly 2 further includes a second locking shaft 24*b* and a locking gear 25*b* that is sleeved on the second locking shaft 24*b*. The second locking shaft 24*b* is connected to the second output end of the first motor 11, the second locking mechanism 32 is arranged/disposed on a side of the second locking gear 25*b*, and the second locking gear 25*b* is meshed with the third driven gear 222*a*.

In this embodiment, each motor uses a dual-path transmission manner. The motor shaft of the first motor 11 uses the double-ended output mode to output a first double-ended output. The first output end of the motor shaft of the first motor 11 drives the first wheel 200 through the first gear reduction mechanism 12 (first path transmission of the first motor 11), and the second output end of the motor shaft of the first motor 11 drives the second wheel 300 through the first locking mechanism 31 and the second gear reduction mechanism 22 (second path transmission of the first motor 11). The motor shaft of the second motor 21 uses the double-ended output mode to output a second double-ended output. The first output end of the motor shaft of the second motor 21 drives the second wheel 300 through the second gear reduction mechanism 22 (first path transmission of the second motor 21), and the second output end of the motor shaft of the second motor 21 drives the first wheel 200 through the second locking mechanism 32 and the first gear reduction mechanism 12 (second path transmission of the second motor 21). Through the dual-path transmission manner, each transmission path has a small load, so that radial sizes of gears can be effectively reduced, thereby improving trafficability.

A position of a first disengaging mechanism 13 is not limited to the first input shaft 124. For example, in an alternative embodiment of Ninth Embodiment, the first disengaging mechanism 13 is arranged/disposed on the first intermediate shaft 126. In this case, one of the first driven gear 1212 and the second driving gear 1221 is an idler gear, and other gear gears are fixed gears.

In another alternative embodiment of Ninth Embodiment, the first disengaging mechanism 13 is arranged/disposed on the first output shaft 125. In this case, the second driven gear 1222 is an idler gear, and other gear gears are fixed gears.

A position of a second disengaging mechanism 23 is not limited to the second input shaft 224. For example, in an alternative embodiment of Ninth Embodiment, the second disengaging mechanism 23 is arranged/disposed on the second intermediate shaft 22*c*. In this case, one of the third driven gear 222*a* and the fourth driving gear 221*b* is an idler gear, and other gear gears are fixed gears.

In another alternative embodiment of Ninth Embodiment, the second disengaging mechanism 23 is arranged/disposed on the second output shaft 225. In this case, the fourth driven gear 222*b* is an idler gear, and other gear gears are fixed gears.

In another alternative embodiment of Ninth Embodiment, the first gear reduction mechanism 12 and the second gear reduction mechanism 22 may also use the two gear multi-level gear reduction mechanism or the single gear three-level reduction mechanism in the foregoing embodiments.

Tenth Embodiment

Figure 11:
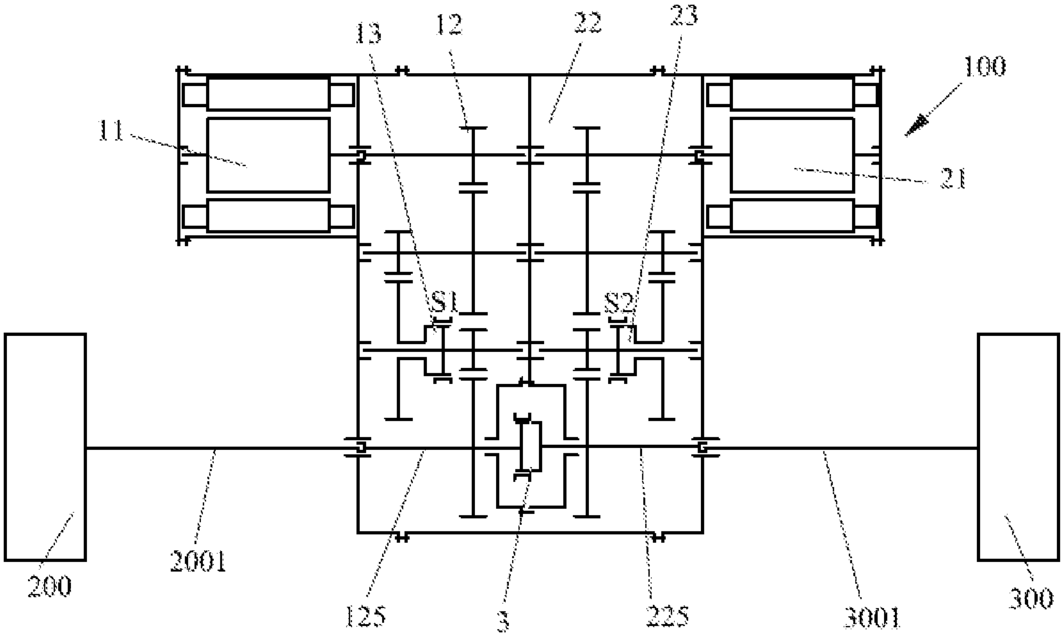
FIG. 11 is a schematic diagram of an electric drive assembly according to Tenth Embodiment of the present disclosure.

FIG. 11 shows an electric drive assembly 100 according to Tenth Embodiment of the present disclosure. A difference between Tenth Embodiment and the foregoing embodiments lies in that, a first motor 11 and a second motor 21 are coaxially arranged/disposed, and a first gear reduction mechanism 12 and a second gear reduction mechanism 22 are located between the first motor 11 and the second motor 21. The electric drive assembly 100 is arranged/configured in a T shape.

A motor shaft of the first motor 11 uses a single-ended output mode to output a first single-ended output, a motor shaft of the second motor 21 uses a single-ended output mode to output a second single-ended output, a locking mechanism 3 is arranged/disposed between a wheel shaft 2001 of a first wheel 200 and a wheel shaft 3001 of a second wheel 300, and the locking mechanism 3 is switchable between an engagement position and a disengagement position. When the locking mechanism 3 is switched to the engagement position, the wheel shaft 2001 of the first wheel 200 is connected to the wheel shaft 3001 of the second wheel 300, so that the first motor 11 is in power coupling with the second motor 21. When the locking mechanism 3 is switched to the disengagement position, the wheel shaft 2001 of the first wheel 200 is disconnected from the wheel shaft 3001 of the second wheel 300, so that power coupling between the first motor 11 and the second motor 21 is interrupted.

In an embodiment, the locking mechanism 3 is connected between an output shaft (a first output shaft 125) of a first gear reduction mechanism 12 and an output shaft (a second output shaft 225) of a second gear reduction mechanism 22. The first output shaft 125, the second output shaft 225, and the wheel shafts are coaxial.

In Tenth Embodiment, each of the first motor 11 and the second motor 21 uses an elongated motor with a large core diameter and a short length. The two motors are coaxially arranged/disposed, and the two gear reduction mechanisms are located between the two motors. Electric control is manufactured in a T-shaped structure by using an all-in-one solution, one part of the electric control is mounted above the input shafts of the gear reduction mechanisms, and the other part of the electric control is mounted above the two motors. In this way, an entire structure is compact, space utilization is high, and high integration of the motors, the electric control, and the gear reduction mechanisms is realized.

Eleventh Embodiment

Figure 12:
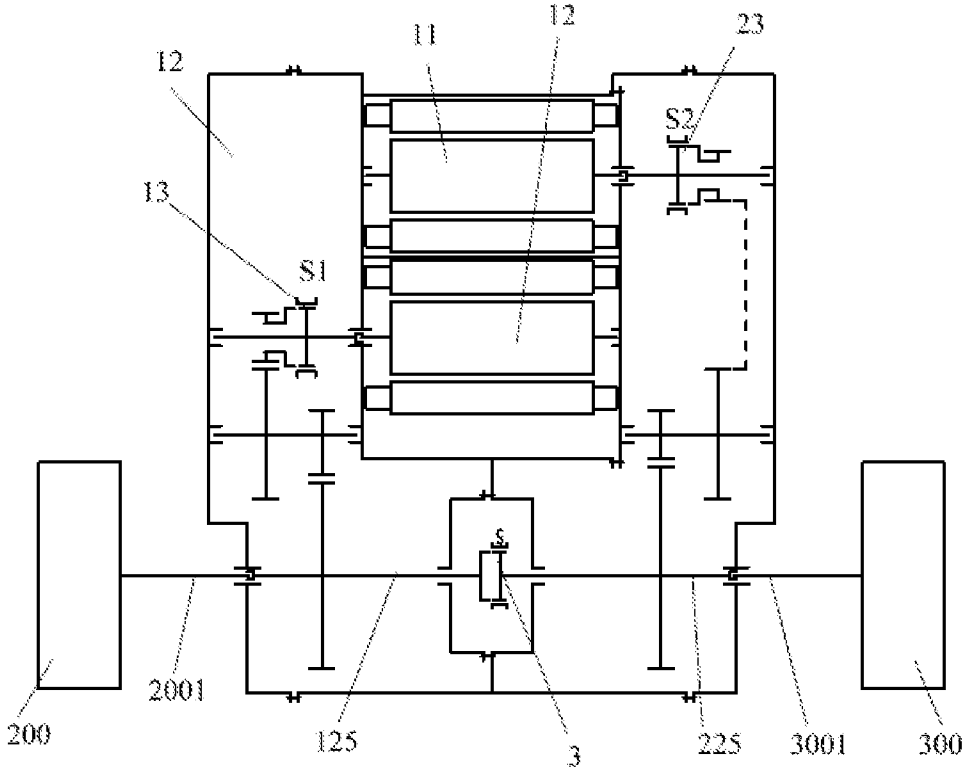
FIG. 12 is a schematic diagram of an electric drive assembly according to Eleventh Embodiment of the present disclosure.
Figure 13:
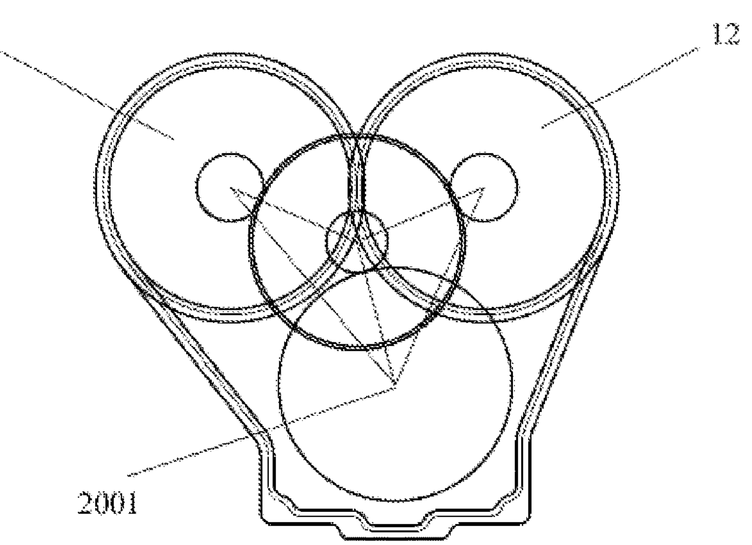
FIG. 13 is a side view of an electric drive assembly according to Eleventh Embodiment of the present disclosure.

FIG. 12 and FIG. 13 show an electric drive assembly 100 according to Eleventh Embodiment of the present disclosure. A difference between Eleventh Embodiment and the foregoing embodiments lies in that, a wheel shaft 2001 of a first wheel 200 and a wheel shaft 3001 of a second wheel 300 are coaxial, a first motor 11, a second motor 21, and the wheel shaft 2001 of the first wheel 200 are spaced parallel to each other, and the first motor 11, the second motor 21, and the wheel shaft 2001 of the first wheel 200 are arranged/disposed in a triangle (disposed in a V shape).

In Eleventh Embodiment, a motor shaft of the first motor 11 uses a single-ended output mode to output a first single-ended output, a motor shaft of the second motor 21 uses a single-ended output mode to output a second single-ended output, and a locking mechanism 3 is arranged/disposed between the wheel shaft 2001 of the first wheel 200 and the wheel shaft 3001 of the second wheel 300, in other words, the locking mechanism 3 is arranged/disposed on a transmission tail end.

The locking mechanism 3 is designed on the transmission tail end and is arranged/disposed on an axis of a motor, so that loads and radial sizes of gear reduction mechanisms can be effectively reduced, thereby increasing a ground clearance and improving trafficability.

In addition, a final transmission gear set (a reduction gear set connected to the first wheel) of a first gear reduction mechanism 12 and a final transmission gear set (a reduction gear set connected to the second wheel) of a second gear reduction mechanism 22) are located below the first motor 11 and the second motor 21, thereby greatly reducing an axial length of the assembly.

Characteristics of the V-shaped arrangement are as follows:

(1) Each motor uses an elongated motor with a small core diameter and a long length. The two motors are arranged/disposed in parallel, so that a Y-directional length is greatly reduced, and X-directional space is fully utilized. The gear reduction mechanisms are located on two ends of the two motors, and the two motors and an output shaft (namely, a wheel shaft) of a gear reduction mechanism are arranged/disposed in a triangle. Electric control is manufactured in a flat type of structure by using an all-in-one solution and is mounted above the two motors. In this way, an entire structure is compact, space utilization is high, and high integration of the motors, the electric control, and the gear reduction mechanisms is realized.

(2) In the V-shaped arrangement, the final transmission gear sets of the gear reduction mechanisms are located below the two motors. In this way, when a slope is climbed at a large angle, gears are easily immersed below an oil level, to be conductive to a design of a lubrication solution and reduce a size of a lubricating oil tank.

Twelfth Embodiment

Figure 19:
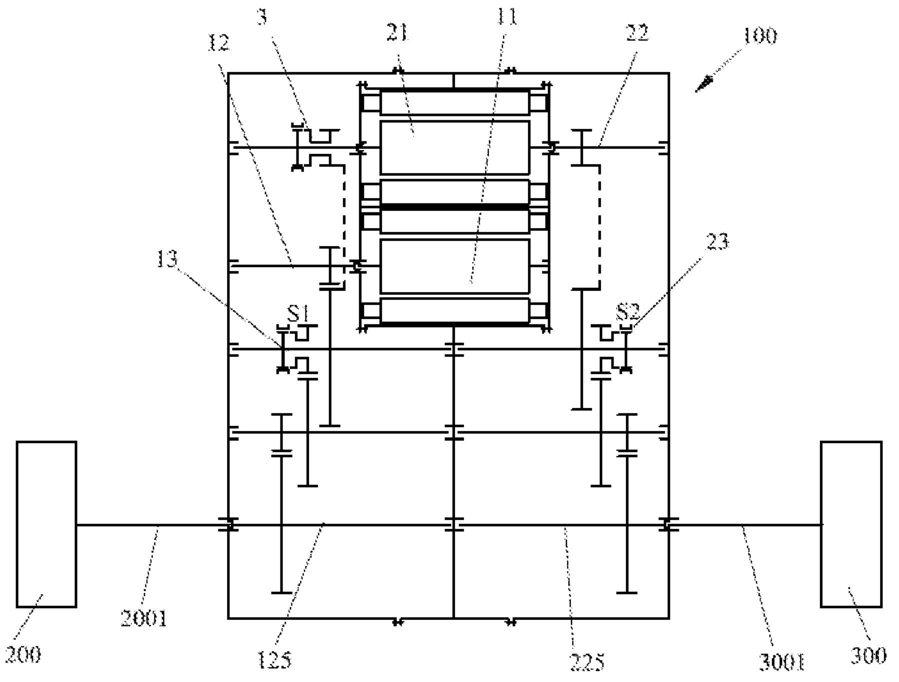
FIG. 19 is a schematic diagram of a four-wheel drive system according to Twelfth Embodiment of the present disclosure.

FIG. 19 shows an electric drive assembly 100 according to Twelfth Embodiment of the present disclosure. A difference between Twelfth Embodiment and Eleventh Embodiment lies in that, a motor shaft of a first motor 11 uses a double-ended output mode to output a double-ended output, a motor shaft of a second motor 21 uses a single-ended output mode to output a single-ended output, and a locking mechanism 3 is arranged/disposed at a second output end of the motor shaft of the first motor 11, in other words, the locking mechanism 3 is arranged/disposed on a transmission front end.

The locking mechanism 3 is arranged/disposed on the transmission front end, so that axial space is effectively utilized, and axial sizes of reduction mechanisms are reduced.

Thirteenth Embodiment

An electric drive assembly is provided in Thirteenth Embodiment of the present disclosure. A difference between Thirteenth Embodiment and Twelfth Embodiment lies in that, a motor shaft of a first motor uses a double-ended output mode to output a double-ended output, a motor shaft of a second motor uses a single-ended output mode to output a single-ended output, and a locking mechanism is arranged/disposed at a second output end of the motor shaft of the second motor, in other words, the locking mechanism is arranged/disposed on a transmission front end.

The locking mechanism is arranged/disposed on the transmission front end, so that axial space is effectively utilized, and axial sizes of reduction mechanisms are reduced.

Fourteenth Embodiment

Figure 20:
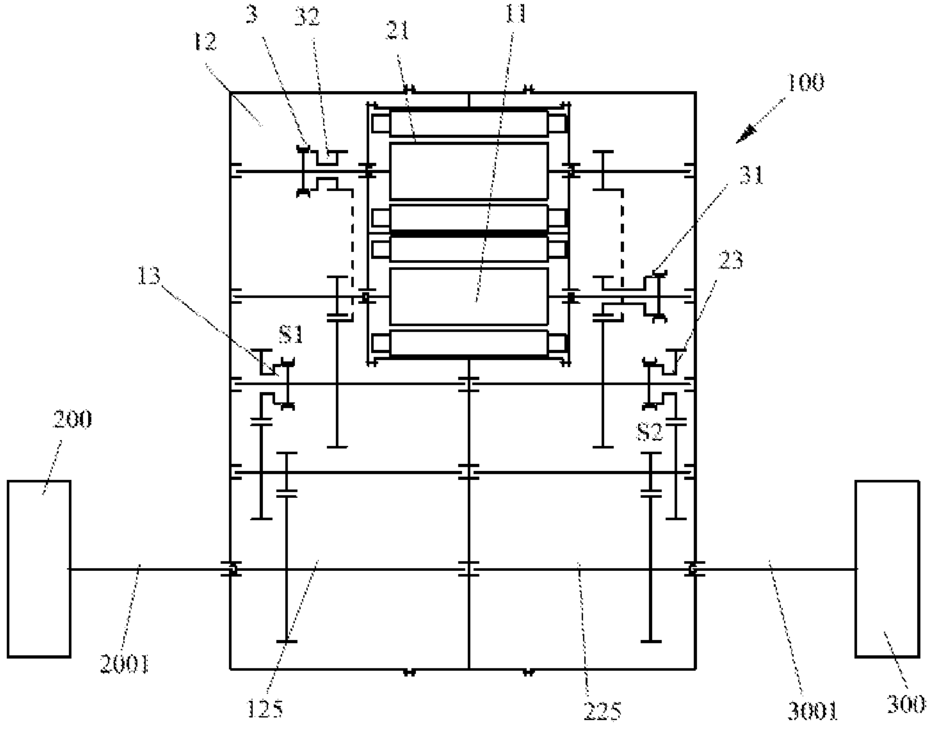
FIG. 20 is a schematic diagram of a four-wheel drive system according to Fourteenth Embodiment of the present disclosure.

FIG. 20 shows an electric drive assembly 100 according to Fourteenth Embodiment of the present disclosure. A difference between Fourteenth Embodiment and Twelfth Embodiment lies in that, a motor shaft of a first motor 11 uses a double-ended output mode to output a first double-ended output, a motor shaft of a second motor 21 uses a double-ended output mode to output a second double-ended output, and a locking mechanism 3 includes a first locking mechanism 31 and a second locking mechanism 32. A first output end of the motor shaft of the first motor 11 is in transmission connection to a first wheel 200 through a first gear reduction mechanism 12, a second output end of the motor shaft of the first motor 11 is connected to a second gear reduction mechanism 22 through a first locking mechanism 31, a first output end of the motor shaft of the second motor 21 is in transmission connection to a second wheel 300 through the second gear reduction mechanism 22, and a second output end of the motor shaft of the second motor 21 is connected to the first gear reduction mechanism 12 through the second locking mechanism 32. In other words, the first locking mechanism 31 and the second locking mechanism 32 are arranged/disposed on a transmission front end.

The locking mechanism (the first locking mechanism 31 and the second locking mechanism 32) is arranged/disposed on the transmission front end, so that axial space is effectively utilized, and axial sizes of the reduction mechanisms are reduced.

Fifteenth Embodiment

Figure 14:
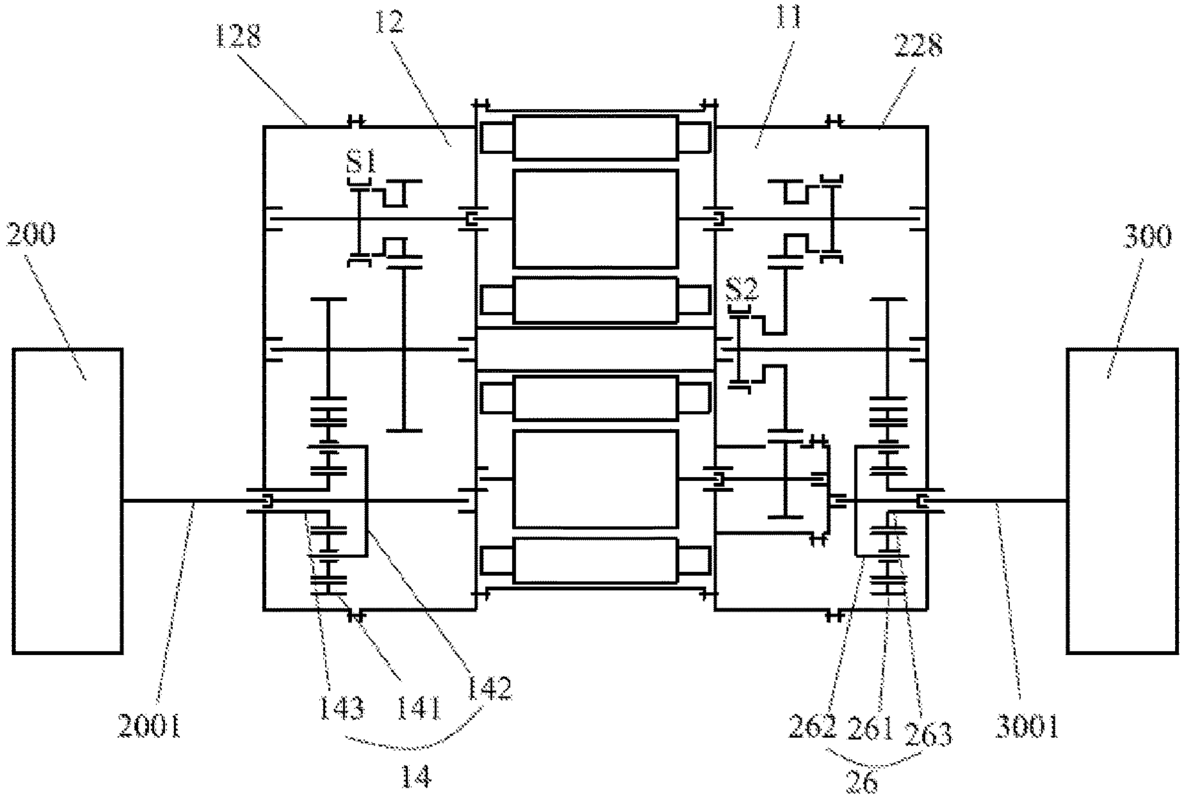
FIG. 14 is a schematic diagram of a four-wheel drive system according to Fifteenth Embodiment of the present disclosure.

FIG. 14 shows an electric drive assembly according to Fifteenth Embodiment of the present disclosure. A difference between Fifteenth Embodiment and the foregoing embodiments lies in that, a first planet gear mechanism 14 is arranged/disposed between a first gear reduction mechanism 12 and a wheel shaft 2001 of a first wheel 200, and a second planet gear mechanism 26 is arranged/disposed between a second gear reduction mechanism 22 and a wheel shaft 3001 of a second wheel 300. A gear ring 141 of the first planet gear mechanism 14 is connected to an output end of the first gear reduction mechanism 12 (to be specific, the gear ring 141 of the first planet gear mechanism 14 is meshed with a driven gear of a final gear set of the first gear reduction mechanism 12), a planet carrier 142 of the first planet gear mechanism 14 is connected to the wheel shaft 2001 of the first wheel 200, and a sun gear 143 of the first planet gear mechanism 14 is fixed on a housing 128 of the first gear reduction mechanism 12.

A gear ring 261 of the second planet gear mechanism 26 is connected to an output end of the second gear reduction mechanism 22 (to be specific, the gear ring 261 of the second planet gear mechanism 26 is meshed with a driven gear of a final gear set of the second gear reduction mechanism 22), a planet carrier 262 of the second planet gear mechanism 26 is connected to the wheel shaft 3001 of the second wheel 300, and a sun gear 263 of the second planet gear mechanism 26 is fixed on a housing 228 of the second gear reduction mechanism 22.

Final transmission gears of gear reduction mechanisms are connected to wheels through planet gear mechanisms, so that radial sizes of gears can be effectively reduced, thereby improving trafficability.

Sixteenth Embodiment

Figure 15:
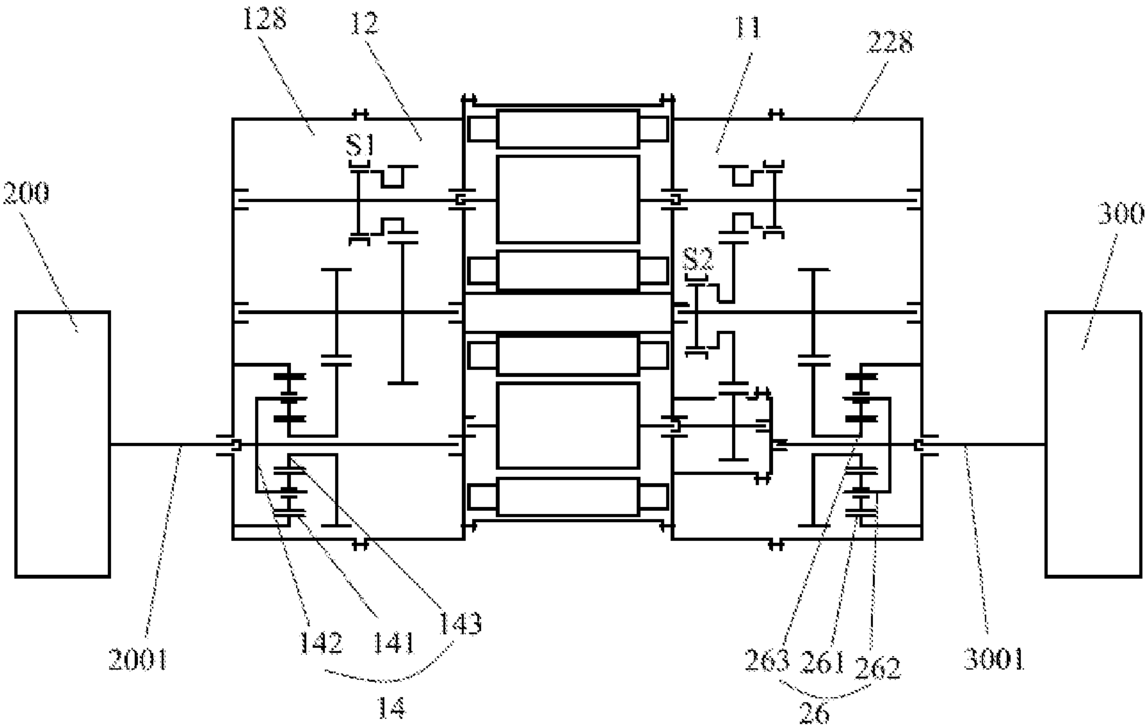
FIG. 15 is a schematic diagram of a four-wheel drive system according to Sixteenth Embodiment of the present disclosure.

FIG. 15 shows an electric drive assembly 100 according to Sixteenth Embodiment of the present disclosure. A difference between Sixteenth Embodiment and the foregoing embodiments lies in that, a first planet gear mechanism 14 is arranged/disposed between a first gear reduction mechanism 12 and a wheel shaft 2001 of a first wheel 200, and a second planet gear mechanism 26 is arranged/disposed between a second gear reduction mechanism 22 and a wheel shaft 3001 of a second wheel 300. A sun gear 143 of the first planet gear mechanism 14 is connected to an output end of the first gear reduction mechanism 12 (to be specific, a sun gear 143 of the first planet gear mechanism 14 is coaxially fixed with a driven gear of a final gear set of the first gear reduction mechanism 12), a planet carrier 142 of the first planet gear mechanism 14 is connected to the wheel shaft 2001 of the first wheel 200, and a gear ring 141 of the first planet gear mechanism 14 is fixed on a housing 128 of the first gear reduction mechanism 12.

A sun gear 263 of the second planet gear mechanism 26 is connected to an output end of the second gear reduction mechanism 22 (to be specific, the sun gear 263 of the second planet gear mechanism 26 is coaxially fixed with a driven gear of a final gear set of the second gear reduction mechanism 22), a planet carrier 262 of the second planet gear mechanism 26 is connected to the wheel shaft 3001 of the second wheel 300, and a gear ring 261 of the second planet gear mechanism 26 is fixed on a housing 228 of the second gear reduction mechanism 22.

Final transmission gears of gear reduction mechanisms are connected to wheels through planet gear mechanisms, so that radial sizes of gears can be effectively reduced, thereby improving trafficability.

Seventeenth Embodiment

Figure 16:
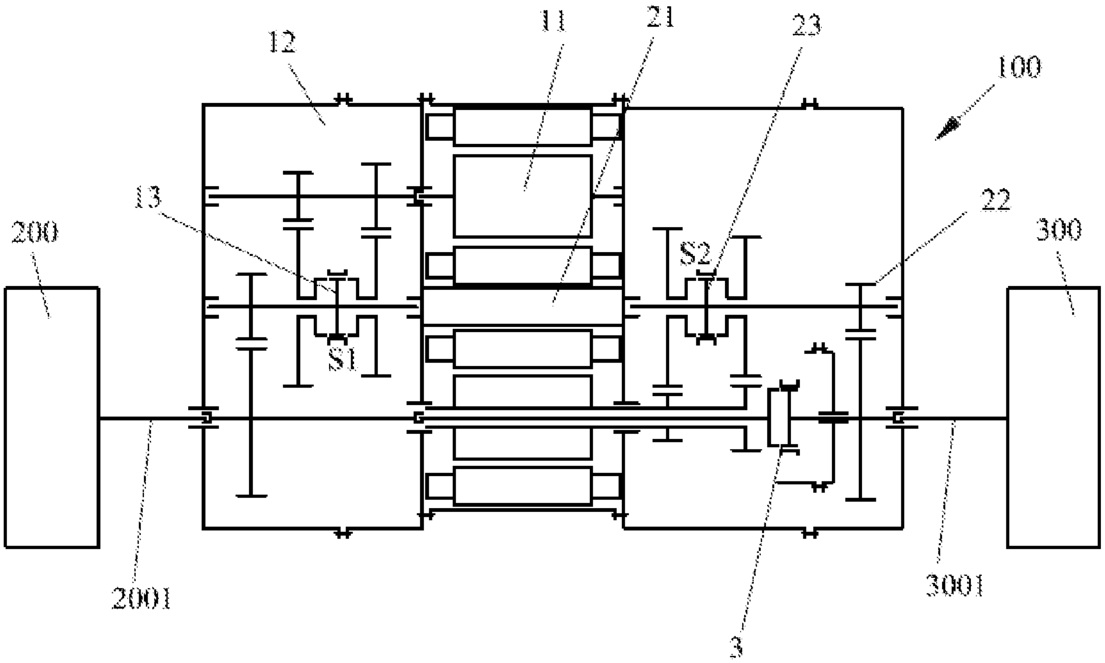
FIG. 16 is a schematic diagram of a four-wheel drive system according to Seventeenth Embodiment of the present disclosure.

FIG. 16 shows electric drive assembly 100 according to Seventeenth Embodiment of the present disclosure. A difference between Seventeenth Embodiment and Third Embodiment lies in that, a first gear reduction mechanism 12 and a second gear reduction mechanism 22 are two gear two-level gear reduction mechanism s.

Eighteenth Embodiment

Figure 17:
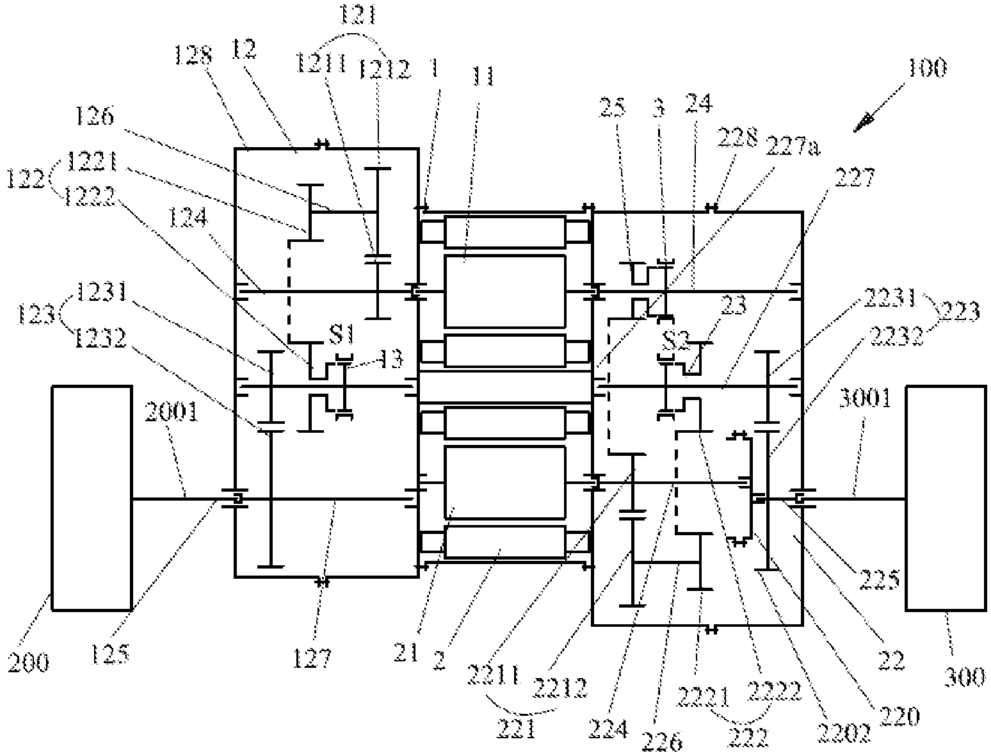
FIG. 17 is a schematic diagram of a four-wheel drive system according to Eighteenth Embodiment of the present disclosure.

FIG. 17 shows an electric drive assembly 100 according to Eighteenth Embodiment of the present disclosure. A difference between Eighteenth Embodiment and Third Embodiment lies in that, each of a first gear reduction mechanism 12 and a second gear reduction mechanism 22 has only one drive gear position.

The first gear reduction mechanism 12 is a single gear three-level gear reducer. The first gear reduction mechanism 12 includes a first reduction gear set 121, a second reduction gear set 122, a third reduction gear set 123, a first input shaft 124, a first output shaft 125, a first intermediate shaft 126, and a second intermediate shaft 127. The first reduction gear set 121 includes a first driving gear 1211 and a first driven gear 1212 that are meshed with each other. The second reduction gear set 122 includes a second driving gear 1221 and a second driven gear 1222 that are meshed with each other. The third reduction gear set 123 includes a third driving gear 1231 and a third driven gear 1232 that are meshed with each other. The first input shaft 124 is connected to a first motor 11, the first output shaft 125 is connected to a wheel shaft 2001 of a first wheel 200, the first driving gear 1211 is arranged/disposed on the first input shaft 124, the first driven gear 1212 and the second driving gear 1221 are arranged/disposed on the first intermediate shaft 126, the second driven gear 1222 and the third driving gear 1231 are arranged/disposed on the second intermediate shaft 127, and the third driven gear 1232 is arranged/disposed on the first output shaft 125.

The second driven gear 1222 is an idler gear that is sleeved on the shaft (the second intermediate shaft 127) on which the second driven gear 1222 is located, and remaining gear gears are fixed gears that are fixed on shafts on which the remaining gear gears are located. The first disengaging mechanism 13 is a first synchronizer S1, and the first synchronizer S1 is arranged/disposed on one axial side of the second driven gear 1222. The first synchronizer S1 can be selectively engaged with and disengaged from the second driven gear 1222, to realize combination or disconnection between the second driven gear 1222 and the shaft on which the second driven gear 1222 is located. When the first synchronizer S1 is engaged with the second driven gear 1222, power of the first motor 11 can sequentially pass through the first input shaft 124, the first reduction gear set 121, the second reduction gear set 122, the third reduction gear set 123, and the first output shaft 125 to be transmitted to the first wheel 200. When the first synchronizer S1 is disengaged from the second driven gear 1222, a power transmission path from the first motor 11 to the first wheel 200 is disconnected at the second driven gear 1222.

The second gear reduction mechanism 22 is a single gear three-level gear reducer. The second gear reduction mechanism 22 includes a fourth reduction gear set 221, a fifth reduction gear set 222, a sixth reduction gear set 223, a second input shaft 224, a second output shaft 225, a third intermediate shaft 226, and a fourth intermediate shaft 227. The fourth reduction gear set 221 includes a fourth driving gear 2211 and a fourth driven gear 2212 that are meshed with each other. The fifth reduction gear set 222 includes a fifth driving gear 2221 and a fifth driven gear 2222 that are meshed with each other. The sixth reduction gear set 223 includes a sixth driving gear 2231 and a sixth driven gear 2232 that are meshed with each other. The second input shaft 224 is connected to a second motor 21, the second output shaft 225 is connected to a wheel shaft 3001 of a second wheel 300, the fourth driving gear 2211 is arranged/disposed on the second input shaft 224, the fourth driven gear 2212 and the fifth driving gear 2221 are arranged/disposed on the third intermediate shaft 226, the fifth driven gear 2222 and the sixth driving gear 2231 are arranged/disposed on the fourth intermediate shaft 227, and the sixth driven gear 2232 is arranged/disposed on the second output shaft 225.

The fifth driven gear 2222 is an idler gear that is sleeved on the shaft (the fourth intermediate shaft 227) on which the fifth driven gear 2222 is located, and remaining gear gears are fixed gears that are fixed on shafts on which the remaining gear gears are located. The second disengaging mechanism 23 is a second synchronizer S2, and the second synchronizer S2 is arranged/disposed on one axial side of the fifth driven gear 2222. The second synchronizer S2 can be selectively engaged with and disengaged from the fifth driven gear 2222, to realize combination or disconnection between the fifth driven gear 2222 and the shaft on which the fifth driven gear 2222 is located. When the second synchronizer S2 is engaged with the fifth driven gear 2222, power of the second motor 21 can sequentially pass through the second input shaft 224, the fourth reduction gear set 221, the fifth reduction gear set 222, and the sixth reduction gear set 223, and the second output shaft 225 to be transmitted to the second wheel 300. When the second synchronizer is disengaged from the fifth driven gear 2222, a power transmission path from the second motor 21 to the second wheel 300 is disconnected at the fifth driven gear 2222.

A motor shaft of the first motor 11 uses a double-ended output mode to output a double-ended output, a motor shaft of the second motor 21 uses a single-ended output mode to output a single-ended output, and a locking mechanism 3 is arranged/disposed at a second output end of the motor shaft of the first motor 11. A first output end of the motor shaft of the first motor 11 is in transmission connection to the first wheel 200 through the first gear reduction mechanism 12, and an output end of the motor shaft of the second motor 21 is in transmission connection to the second wheel 300 through the second gear reduction mechanism 22. When the locking mechanism 3 is switched to an engagement position, the second output end of the motor shaft of the first motor 11 is in transmission connection to the second gear reduction mechanism 22, so that the first motor 11 is in power coupling with the second motor 21. When the locking mechanism 3 is switched to a disengagement position, the second output end of the motor shaft of the first motor 11 is disconnected from the second gear reduction mechanism 22, so that power coupling between the first motor 11 and the second motor 21 is interrupted.

In an embodiment, a second wheel drive assembly 2 further includes a locking shaft 24 and a locking gear 25 that is sleeved on the locking shaft 24. The locking shaft 24 is connected to the second output end of the motor shaft of the first motor 11, the locking mechanism 3 is arranged/disposed on a side of the locking gear 25, and the locking gear 25 is meshed with the first driving gear 1211.

In an alternative embodiment of Eighteenth Embodiment, the locking gear 25 may also be meshed with the first driven gear 1212.

Nineteenth Embodiment

Figure 18:
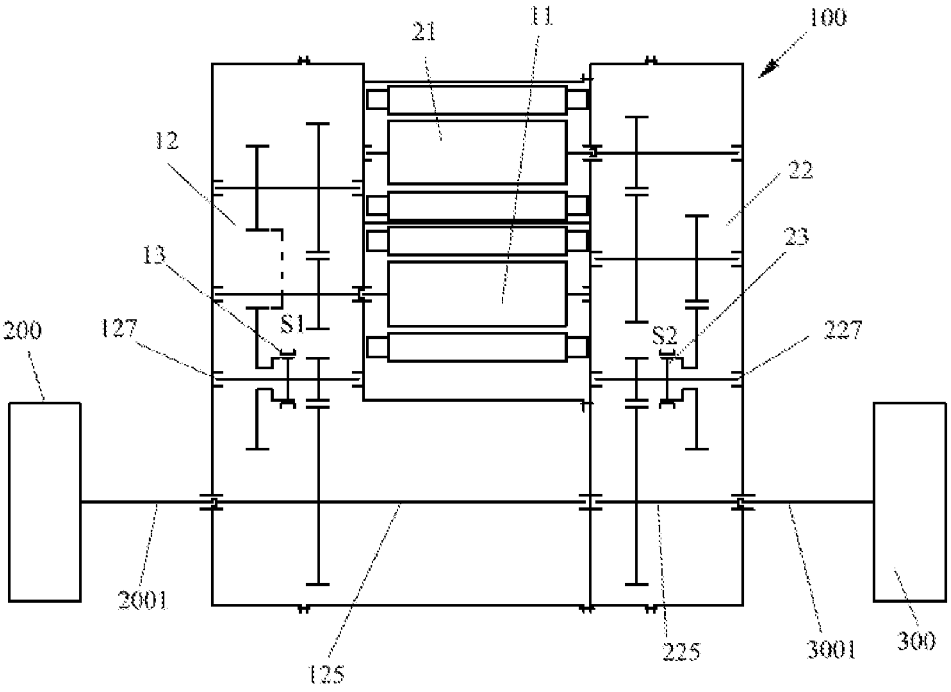
FIG. 18 is a schematic diagram of a four-wheel drive system according to Nineteenth Embodiment of the present disclosure.

FIG. 18 shows an electric drive assembly 100 according to Nineteenth Embodiment of the present disclosure. A difference between Nineteenth Embodiment and Eleventh Embodiment lies in that, a locking mechanism 3 is canceled.

In addition, a first disengaging mechanism 13 is arranged/disposed on a second intermediate shaft 127, and a second disengaging mechanism 23 is arranged/disposed on a fourth intermediate shaft 227.

Twentieth Embodiment

Figure 21:
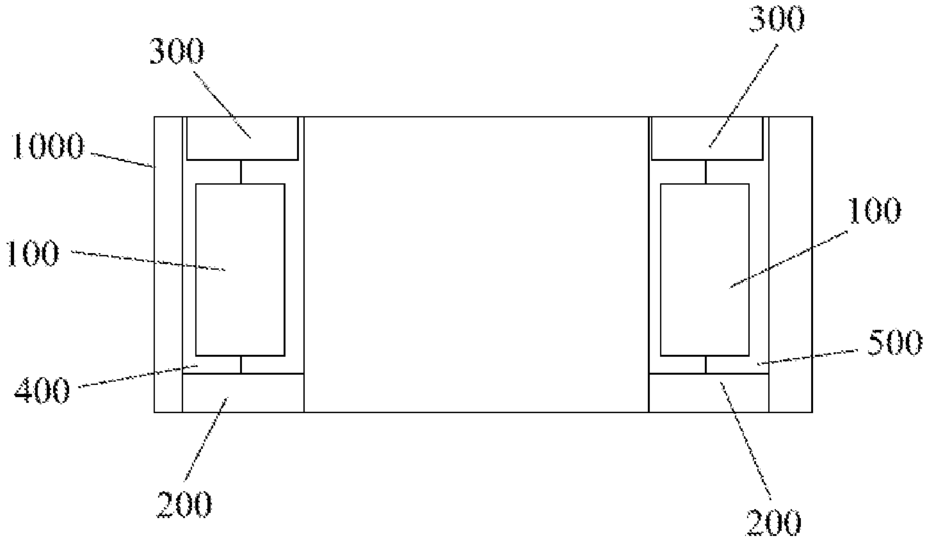
FIG. 21 is a schematic diagram of a four-wheel drive system according to Twentieth Embodiment of the present disclosure.

FIG. 21 shows a four-wheel drive system 1000 according to Twentieth Embodiment of the present disclosure. The four-wheel drive system 1000 includes a front drive bridge 400 and a rear drive bridge 500. The foregoing electric drive assembly 100 is arranged/disposed on both the front drive bridge 400 and the rear drive bridge 500.

Twenty-First Embodiment

Figure 22:
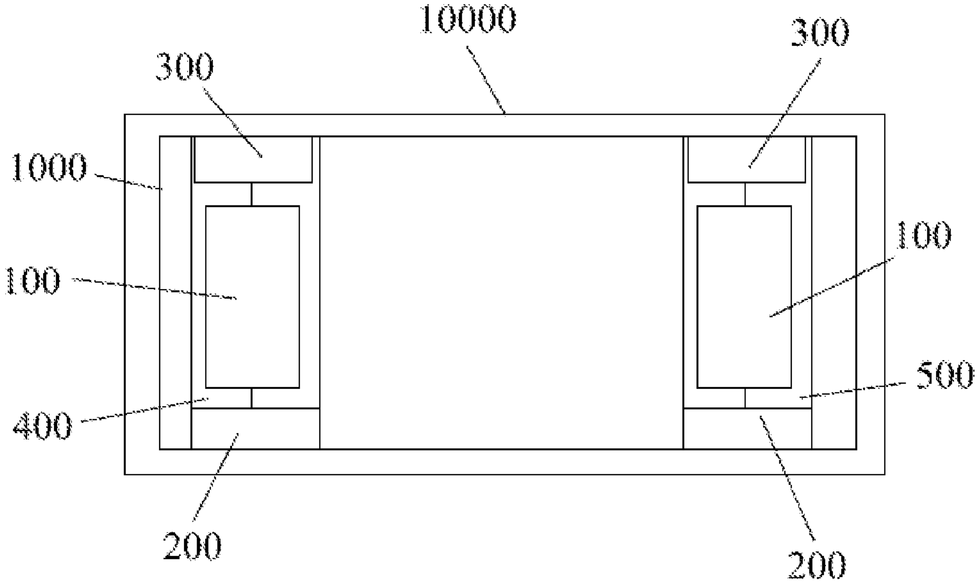
FIG. 22 is a schematic diagram of a vehicle according to Twenty-first Embodiment of the present disclosure.

FIG. 22 shows a vehicle 10000 according to Twentieth Embodiment of the present disclosure. The vehicle 10000 includes the foregoing electric drive assembly 100 or four-wheel drive system 1000.

In the descriptions of this specification, descriptions using reference terms "an embodiment", "some embodiments", "an exemplary embodiment", "an example", "a specific example", or "some examples" mean that specific characteristics, structures, materials, or features described with reference to the embodiment or example are included in at least one embodiment or example of the present disclosure. In this specification, schematic descriptions of the foregoing terms do not necessarily point at a same embodiment or example. In addition, the described specific features, structures, materials, or characteristics may be combined in a proper manner in any one or more of the embodiments or examples.

Although the embodiments of the present disclosure have been shown and described, persons of ordinary skill in the art should understand that various changes, modifications, replacements and variations may be made to the embodiments without departing from the principles and spirit of the present disclosure, and the scope of the present disclosure is as defined by the appended claims and their equivalents.

What is claimed is:

1. An electric drive assembly, comprising a first wheel drive assembly configured to drive a first wheel and a second wheel drive assembly configured to drive a second wheel, one of the first wheel and the second wheel being a left side wheel, and the other one of the first wheel and the second wheel being a right side wheel;

the first wheel drive assembly comprising a first motor, a first gear reduction mechanism, and a first disengaging mechanism; the first gear reduction mechanism being connected between the first motor and the first wheel; the first disengaging mechanism being configured to switch between an engagement position and a disengagement position of the first disengaging mechanism; when the first disengaging mechanism is switched to the engagement position of the first disengaging mechanism, power of the first motor being transmitted to the first wheel through the first gear reduction mechanism; and when the first disengaging mechanism is switched to the disengagement position of the first disengaging mechanism, power transmission between the first motor and the first wheel being interrupted; and the second wheel drive assembly comprising a second motor, a second gear reduction mechanism, and a second disengaging mechanism; the second gear reduction mechanism being connected between the second motor and the second wheel; the second disengaging mechanism being configured to switch between an engagement position and a disengagement position of the second disengaging mechanism; when the second disengaging mechanism is switched to the engagement position of the second disengaging mechanism, power of the second motor being transmitted to the second wheel through the second gear reduction mechanism; and when the second disengaging mechanism is switched to the disengagement position of the second disengaging mechanism, power transmission between the second motor and the second wheel being interrupted, wherein a first planet gear mechanism is disposed between the first gear reduction mechanism and a wheel shaft of the first wheel, and a second planet gear mechanism is disposed between the second gear reduction mechanism and a wheel shaft of the second wheel;

a gear ring of the first planet gear mechanism is connected to an output end of the first gear reduction mechanism, and a planet carrier of the first planet gear mechanism is connected to the wheel shaft of the first wheel; or a sun gear of the first planet gear mechanism is connected to an output end of the first gear reduction mechanism, and a planet carrier of the first planet gear mechanism is connected to the wheel shaft of the first wheel; and a gear ring of the second planet gear mechanism is connected to an output end of the second gear reduction mechanism, and a planet carrier of the second planet gear mechanism is connected to the wheel shaft of the second wheel; or a sun gear of the second planet gear mechanism is connected to an output end of the second gear reduction mechanism, and a planet carrier of the second planet gear mechanism is connected to the wheel shaft of the second wheel.

2. The electric drive assembly according to claim 1, wherein the engagement position of the first disengaging mechanism comprises a first engagement position of the first disengaging mechanism and a second engagement position of the first disengaging mechanism, when the first disengaging mechanism is switched to the first engagement position of the first disengaging mechanism, the power of the first motor is transmitted to the first wheel through a first gear transmission path of the first gear reduction mechanism, and when the first disengaging mechanism is switched to the second engagement position of the first disengaging mechanism, the power of the first motor is transmitted to the first wheel through a second gear transmission path of the first gear reduction mechanism; and the engagement position of the second disengaging mechanism comprises a first engagement position of the second disengaging mechanism and a second engagement position of the second disengaging mechanism, when the second disengaging mechanism is switched to the first engagement position of the second disengaging mechanism, the power of the second motor is transmitted to the second wheel through a first gear transmission path of the second gear reduction mechanism, and when the second disengaging mechanism is switched to the second engagement position of the second disengaging mechanism, the power of the second motor is transmitted to the second wheel through a second gear transmission path of the second gear reduction mechanism.

3. The electric drive assembly according to claim 1, wherein a locking mechanism is disposed between the first wheel drive assembly and the second wheel drive assembly, and the locking mechanism is configured to switch between an engagement position and a disengagement position of the locking mechanism, when the locking mechanism is switched to the engagement position of the locking mechanism, the first motor is in power coupling with the second motor, and when the locking mechanism is switched to the disengagement position of the locking mechanism, the power coupling between the first motor and the second motor is interrupted.

4. The electric drive assembly according to claim 2, wherein the first motor and the second motor are disposed in parallel; and one of the first motor and the second motor is parallel to and spaced from a wheel shaft of a corresponding wheel and partially overlaps a projection of the wheel shaft of the corresponding wheel in a left-right direction, or one of the first motor and the second motor is coaxial with a wheel shaft of a corresponding wheel.

5. The electric drive assembly according to claim 4, wherein a motor shaft of the first motor is configured to provide a first single-ended output, a motor shaft of the second motor is configured to provide a second single-ended output, and a locking mechanism is disposed between a wheel shaft of the first wheel and a wheel shaft of the second wheel;

when the locking mechanism is switched to an engagement position of the locking mechanism, the wheel shaft of the first wheel is connected to the wheel shaft of the second wheel, and the first motor is in power coupling with the second motor; and when the locking mechanism is switched to a disengagement position of the locking mechanism, the wheel shaft of the first wheel is disconnected from the wheel shaft of the second wheel, and the power coupling between the first motor and the second motor is interrupted.

6. The electric drive assembly according to claim 4, wherein a motor shaft of the first motor is configured to provide a double-ended output, a motor shaft of the second motor is configured to provide a single-ended output, and a locking mechanism is disposed at a second output end of the motor shaft of the first motor, wherein a first output end of the motor shaft of the first motor is in transmission connection to the first wheel through the first gear reduction mechanism, and an output end of the motor shaft of the second motor is in transmission connection to the second wheel through the second gear reduction mechanism;

when the locking mechanism is switched to an engagement position of the locking mechanism, the second output end of the motor shaft of the first motor is in transmission connection to the second gear reduction mechanism, and the first motor is in power coupling with the second motor; and when the locking mechanism is switched to a disengagement position of the locking mechanism, the second output end of the motor shaft of the first motor is disconnected from the second gear reduction mechanism, and the power coupling between the first motor and the second motor is interrupted.

7. The electric drive assembly according to claim 4, wherein a motor shaft of the first motor is configured to provide a first double-ended output, a motor shaft of the second motor is configured to provide a second double-ended output, and a locking mechanism comprises a first locking mechanism and a second locking mechanism, wherein a first output end of the motor shaft of the first motor is in transmission connection to the first wheel through the first gear reduction mechanism, a second output end of the motor shaft of the first motor is connected to the second gear reduction mechanism through the first locking mechanism, a first output end of the motor shaft of the second motor is in transmission connection to the second wheel through the second gear reduction mechanism, and a second output end of the motor shaft of the second motor is connected to the first gear reduction mechanism through the second locking mechanism;

when the first locking mechanism is switched to an engagement position of the first locking mechanism and the second locking mechanism is switched to an engagement position of the second locking mechanism, the second output end of the motor shaft of the first motor is in transmission connection to the second gear reduction mechanism and drives the second wheel, the second output end of the motor shaft of the second motor is in transmission connection to the first gear reduction mechanism and drives the first wheel, and the first motor is in power coupling with the second motor, to drive the first wheel and the second wheel;

when the first locking mechanism is switched to the engagement position of the first locking mechanism and the second locking mechanism is switched to a disengagement position of the second locking mechanism, the second output end of the motor shaft of the first motor is in transmission connection to the second gear reduction mechanism and drives the second wheel, the second output end of the motor shaft of the second motor is disconnected from the first gear reduction mechanism, and the first motor is in power coupling with the second motor, to drive the second wheel;

when the first locking mechanism is switched to a disengagement position of the first locking mechanism and the second locking mechanism is switched to the engagement position of the second locking mechanism, the second output end of the motor shaft of the second motor is in transmission connection to the first gear reduction mechanism, the second output end of the motor shaft of the first motor is disconnected from the second gear reduction mechanism, and the first motor is in power coupling with the second motor, to drive the first wheel; and when the first locking mechanism is switched to the disengagement position of the first locking mechanism and the second locking mechanism is switched to the disengagement position of the second locking mechanism, the second output end of the motor shaft of the first motor is disconnected from the second gear reduction mechanism, the second output end of the motor shaft of the second motor is disconnected from the first gear reduction mechanism, and the power coupling between the first motor and the second motor is interrupted.

8. The electric drive assembly according to claim 1, wherein the first motor and the second motor are coaxially disposed, and the first gear reduction mechanism and the second gear reduction mechanism are located between the first motor and the second motor.

9. The electric drive assembly according to claim 8, wherein a motor shaft of the first motor is configured to provide a first single-ended output, a motor shaft of the second motor is configured to provide a second single-ended output, a locking mechanism is disposed between a wheel shaft of the first wheel and a wheel shaft of the second wheel, and the locking mechanism is configured to switch between an engagement position of the locking mechanism and a disengagement position of the locking mechanism, when the locking mechanism is switched to the engagement position of the locking mechanism, the wheel shaft of the first wheel is connected to the wheel shaft of the second wheel, and the first motor is in power coupling with the second motor, and when the locking mechanism is switched to the disengagement position of the locking mechanism, the wheel shaft of the first wheel is disconnected from the wheel shaft of the second wheel, and the power coupling between the first motor and the second motor is interrupted.

10. The electric drive assembly according to claim 1, wherein a wheel shaft of the first wheel and a wheel shaft of the second wheel are coaxial, the first motor, the second motor, and the wheel shaft of the first wheel are parallel to and spaced from each other, and the first motor, the second motor, and the wheel shaft of the first wheel are disposed in a triangle.

11. The electric drive assembly according to claim 10, wherein a motor shaft of the first motor is configured to provide a first single-ended output, a motor shaft of the second motor is configured to provide a second single-ended output, a locking mechanism is disposed between a wheel shaft of the first wheel and a wheel shaft of the second wheel, and the locking mechanism is configured to switch between an engagement position and a disengagement position of the locking mechanism, when the locking mechanism is switched to the engagement position of the locking mechanism, the wheel shaft of the first wheel is connected to the wheel shaft of the second wheel, and the first motor is in power coupling with the second motor, and when the locking mechanism is switched to the disengagement position of the locking mechanism, the wheel shaft of the first wheel is disconnected from the wheel shaft of the second wheel, and the power coupling between the first motor and the second motor is interrupted.

12. The electric drive assembly according to claim 10, wherein a motor shaft of the first motor is configured to provide a double-ended output, a motor shaft of the second motor is configured to provide a single-ended output, and a locking mechanism is disposed at a second output end of the motor shaft of the first motor, wherein a first output end of the motor shaft of the first motor is in transmission connection to the first wheel through the first gear reduction mechanism, and an output end of the motor shaft of the second motor is in transmission connection to the second wheel through the second gear reduction mechanism;

when the locking mechanism is switched to an engagement position of the locking mechanism, the second output end of the motor shaft of the first motor is in transmission connection to the second gear reduction mechanism, and the first motor is in power coupling with the second motor; and when the locking mechanism is switched to a disengagement position of the locking mechanism, the second output end of the motor shaft of the first motor is disconnected from the second gear reduction mechanism, and the power coupling between the first motor and the second motor is interrupted.

13. The electric drive assembly according to claim 10, wherein a motor shaft of the first motor is configured to provide a first double-ended output, a motor shaft of the second motor is configured to provide a second double-ended output, and a locking mechanism comprises a first locking mechanism and a second locking mechanism, wherein a first output end of the motor shaft of the first motor is in transmission connection to the first wheel through the first gear reduction mechanism, a second output end of the motor shaft of the first motor is connected to the second gear reduction mechanism through the first locking mechanism, a first output end of the motor shaft of the second motor is in transmission connection to the second wheel through the second gear reduction mechanism, and a second output end of the motor shaft of the second motor is connected to the first gear reduction mechanism through the second locking mechanism;

when the first locking mechanism is switched to an engagement position of the first locking mechanism and the second locking mechanism is switched to an engagement position of the second locking mechanism, the second output end of the motor shaft of the first motor is in transmission connection to the second gear reduction mechanism and drives the second wheel, the second output end of the motor shaft of the second motor is in transmission connection to the first gear reduction mechanism and drives the first wheel, and the first motor is in power coupling with the second motor, to drive the first wheel and the second wheel;

when the first locking mechanism is switched to the engagement position of the first locking mechanism and the second locking mechanism is switched to a disengagement position of the second locking mechanism, the second output end of the motor shaft of the first motor is in transmission connection to the second gear reduction mechanism and drives the second wheel, the second output end of the motor shaft of the second motor is disconnected from the first gear reduction mechanism, and the first motor is in power coupling with the second motor, to drive the second wheel;

when the first locking mechanism is switched to a disengagement position of the first locking mechanism and the second locking mechanism is switched to the engagement position of the second locking mechanism, the second output end of the motor shaft of the second motor is in transmission connection to the first gear reduction mechanism, the second output end of the motor shaft of the first motor is disconnected from the second gear reduction mechanism, and the first motor is in power coupling with the second motor, to drive the first wheel; and when the first locking mechanism is switched to the disengagement position of the first locking mechanism and the second locking mechanism is switched to the disengagement position of the second locking mechanism, the second output end of the motor shaft of the first motor is disconnected from the second gear reduction mechanism, the second output end of the motor shaft of the second motor is disconnected from the first gear reduction mechanism, and the power coupling between the first motor and the second motor is interrupted.

14. The electric drive assembly according to claim 6, wherein the locking mechanism comprises a synchronizer integrating with a one-way clutch.

15. A four-wheel drive system, comprising a front drive bridge, a rear drive bridge, an electric drive assembly being disposed on the front drive bridge and the rear drive bridge, wherein the electric drive assembly comprises:

a first wheel drive assembly configured to drive a first wheel and a second wheel drive assembly configured to drive a second wheel, one of the first wheel and the second wheel being a left side wheel, and the other one of the first wheel and the second wheel being a right side wheel;

the first wheel drive assembly comprising a first motor, a first gear reduction mechanism, and a first disengaging mechanism; the first gear reduction mechanism being connected between the first motor and the first wheel; the first disengaging mechanism being configured to switch between an engagement position and a disengagement position of the first disengaging mechanism; when the first disengaging mechanism is switched to the engagement position of the first disengaging mechanism, power of the first motor being transmitted to the first wheel through the first gear reduction mechanism; and when the first disengaging mechanism is switched to the disengagement position of the first disengaging mechanism, power transmission between the first motor and the first wheel being interrupted; and the second wheel drive assembly comprising a second motor, a second gear reduction mechanism, and a second disengaging mechanism; the second gear reduction mechanism being connected between the second motor and the second wheel; the second disengaging mechanism being configured to switch between an engagement position and a disengagement position of the second disengaging mechanism; when the second disengaging mechanism is switched to the engagement position of the second disengaging mechanism, power of the second motor being transmitted to the second wheel through the second gear reduction mechanism; and when the second disengaging mechanism is switched to the disengagement position of the second disengaging mechanism, power transmission between the second motor and the second wheel being interrupted, wherein the first motor and the second motor are disposed in parallel; and one of the first motor and the second motor is parallel to and spaced from a wheel shaft of a corresponding wheel and partially overlaps a projection of the wheel shaft of the corresponding wheel in a left-right direction, or one of the first motor and the second motor is coaxial with a wheel shaft of a corresponding wheel.

16. The four-wheel drive system according to claim 15, wherein the engagement position of the first disengaging mechanism comprises a first engagement position of the first disengaging mechanism and a second engagement position of the first disengaging mechanism, when the first disengaging mechanism is switched to the first engagement position of the first disengaging mechanism, the power of the first motor is transmitted to the first wheel through a first gear transmission path of the first gear reduction mechanism, and when the first disengaging mechanism is switched to the second engagement position of the first disengaging mechanism, the power of the first motor is transmitted to the first wheel through a second gear transmission path of the first gear reduction mechanism; and the engagement position of the second disengaging mechanism comprises a first engagement position of the second disengaging mechanism and a second engagement position of the second disengaging mechanism, when the second disengaging mechanism is switched to the first engagement position of the second disengaging mechanism, the power of the second motor is transmitted to the second wheel through a first gear transmission path of the second gear reduction mechanism, and when the second disengaging mechanism is switched to the second engagement position of the second disengaging mechanism, the power of the second motor is transmitted to the second wheel through a second gear transmission path of the second gear reduction mechanism.

17. The four-wheel drive system according to claim 15, wherein a locking mechanism is disposed between the first wheel drive assembly and the second wheel drive assembly, and the locking mechanism is configured to switch between an engagement position and a disengagement position of the locking mechanism, when the locking mechanism is switched to the engagement position of the locking mechanism, the first motor is in power coupling with the second motor, and when the locking mechanism is switched to the disengagement position of the locking mechanism, the power coupling between the first motor and the second motor is interrupted.

18. A vehicle, comprising a four-wheel drive system comprising a front drive bridge, a rear drive bridge, an electric drive assembly being disposed on the front drive bridge and the rear drive bridge, wherein the electric drive assembly comprises:

a first wheel drive assembly configured to drive a first wheel and a second wheel drive assembly configured to drive a second wheel, one of the first wheel and the second wheel being a left side wheel, and the other one of the first wheel and the second wheel being a right side wheel;

the first wheel drive assembly comprising a first motor, a first gear reduction mechanism, and a first disengaging mechanism; the first gear reduction mechanism being connected between the first motor and the first wheel; the first disengaging mechanism being configured to switch between an engagement position and a disengagement position of the first disengaging mechanism; when the first disengaging mechanism is switched to the engagement position of the first disengaging mechanism, power of the first motor being transmitted to the first wheel through the first gear reduction mechanism; and when the first disengaging mechanism is switched to the disengagement position of the first disengaging mechanism, power transmission between the first motor and the first wheel being interrupted; and the second wheel drive assembly comprising a second motor, a second gear reduction mechanism, and a second disengaging mechanism; the second gear reduction mechanism being connected between the second motor and the second wheel; the second disengaging mechanism being configured to switch between an engagement position and a disengagement position of the second disengaging mechanism; when the second disengaging mechanism is switched to the engagement position of the second disengaging mechanism, power of the second motor being transmitted to the second wheel through the second gear reduction mechanism; and when the second disengaging mechanism is switched to the disengagement position of the second disengaging mechanism, power transmission between the second motor and the second wheel being interrupted, wherein the first motor and the second motor are coaxially disposed, and the first gear reduction mechanism and the second gear reduction mechanism are located between the first motor and the second motor, a motor shaft of the first motor is configured to provide a first single-ended output, a motor shaft of the second motor is configured to provide a second single-ended output, a locking mechanism is disposed between a wheel shaft of the first wheel and a wheel shaft of the second wheel, and the locking mechanism is configured to switch between an engagement position of the locking mechanism and a disengagement position of the locking mechanism, when the locking mechanism is switched to the engagement position of the locking mechanism, the wheel shaft of the first wheel is connected to the wheel shaft of the second wheel, and the first motor is in power coupling with the second motor, and when the locking mechanism is switched to the disengagement position of the locking mechanism, the wheel shaft of the first wheel is disconnected from the wheel shaft of the second wheel, and the power coupling between the first motor and the second motor is interrupted.

* * * * *